United States Patent
Mohammad et al.

(10) Patent No.: US 12,095,775 B1
(45) Date of Patent: Sep. 17, 2024

(54) EXCHANGE INTERCONNECTION USING AN INTERCONNECTION TOKEN

(71) Applicant: Equinix, Inc., Redwood City, CA (US)

(72) Inventors: Arifulla Baig Mohammad, Mountain House, CA (US); Sudhanva Gnaneshwar, Livermore, CA (US); Lakshmi Sarath Prathipati, San Jose, CA (US)

(73) Assignee: Equinix, Inc., Redwood City, CA (US)

( * ) Notice: Subject to any disclaimer, the term of this patent is extended or adjusted under 35 U.S.C. 154(b) by 511 days.

(21) Appl. No.: 17/402,356

(22) Filed: Aug. 13, 2021

Related U.S. Application Data

(60) Provisional application No. 63/071,986, filed on Aug. 28, 2020.

(51) Int. Cl.
*H04L 9/40* (2022.01)
*H04L 12/46* (2006.01)
*H04L 41/0806* (2022.01)

(52) U.S. Cl.
CPC ............ *H04L 63/108* (2013.01); *H04L 12/46* (2013.01); *H04L 41/0806* (2013.01); *H04L 63/08* (2013.01)

(58) Field of Classification Search
CPC ... H04L 63/108; H04L 63/08; H04L 41/0806; H04L 12/46
USPC .......................................................... 726/4
See application file for complete search history.

(56) References Cited

U.S. PATENT DOCUMENTS

| | | |
|---|---|---|
| 9,886,267 B2 | 2/2018 | Maheshwari et al. |
| 9,948,552 B2 | 4/2018 | Teng et al. |
| 10,129,078 B2 | 11/2018 | Kumar et al. |

OTHER PUBLICATIONS https://web.archive.org/web/20220704033930/https://docs.equinix.com/en-us/Content/Interconnection/Fabric/service%20tokens/Fabric-Service-Tokens.htm (Year: 2022).*
U.S. Appl. No. 16/836,777, filed Mar. 31, 2020, by Iqbal et al.
U.S. Appl. No. 17/321,229, filed May 14, 2021, by Durrani et al.

* cited by examiner

*Primary Examiner* — Benjamin A Kaplan
(74) *Attorney, Agent, or Firm* — Shumaker & Sieffert, P.A.

(57) ABSTRACT

In some examples, a method includes generating, by an interconnection platform for an exchange, an interconnection token representing authorization for an interconnection to or from a resource of the exchange, wherein the interconnection token comprises a unique identifier and token data for requesting and provisioning an interconnection using the resource. The method also includes outputting a first indication of the unique identifier of the interconnection token. The method also includes provisioning, by the interconnection platform, in response to receiving, from a customer of an exchange provider of the exchange, a second indication of the unique identifier of the interconnection token and based on the authorization, an interconnection in a network device of the exchange, the interconnection including, or connecting to or from, the resource.

20 Claims, 19 Drawing Sheets and among customers and service providers.
EXCHANGE INTERCONNECTION USING AN INTERCONNECTION TOKEN This application claims the benefit of U.S. Provisional Application No. 63/071,986, filed Aug. 28, 2020, the entire content of which is herein incorporated by reference.

TECHNICAL FIELD

The disclosure relates to computer networks and, more specifically, to exchanges for facilitating interconnections among customers and service providers.

BACKGROUND

Cloud computing refers to the use of dynamically scalable computing resources accessible via a network, such as the Internet. The computing resources, often referred to as a "cloud," provide one or more services to users. These services may be categorized according to service types, which may include for example, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

SUMMARY

In general, this disclosure describes techniques for managing interconnections in an exchange using interconnection tokens. An exchange includes physical and/or virtual networking devices managed by and configured by an exchange provider to connect pairs of networks to one another at a location. A customer of an exchange provider may be reluctant to colocate customer equipment within a data center that hosts the exchange or to purchase a dedicated network port having connectivity with the exchange fabric. Such a customer may not have the resources to justify this capital investment, may need only short-term interconnections on the exchange, or may need interconnections on the exchange more quickly than the port authorization process can provide. Example exchanges may include cloud exchanges, Ethernet exchanges, Internet exchanges.

An interconnection platform for the exchange or a network service provider platform may respond to a request from a customer for an interconnection on the exchange with an interconnection token. As part of generating the interconnection token, the interconnection platform or network service provider platform may reserve network resources (also referred to herein as "assets") in the form of devices, gateways, ports, or interconnection assets of the exchange for instance, for the customer and associating the details of the request and of the corresponding reserved resources with an interconnection token. The reserved interconnection assets may include attachment circuits (e.g., VLANs) for exchange ports. In general, the interconnection token is a data structure that indicates details of the requested interconnection. Such details may include a shared port and a corresponding attachment circuit, a provider port and a corresponding attachment circuit, the type of resource reserved, a bandwidth, an expiration date for the interconnection token, and unique identifier for the interconnection token.

The interconnection token is provided to the customer, which is able to submit the interconnection token at a portal to the interconnection platform. Upon successfully validating the interconnection token, the interconnection platform provisions the requested interconnection according to the details specified in the interconnection token.

The techniques may provide one or more technical improvements that result in at least one practical application. For example, because the interconnection tokens are associated with details of the reserved resources and are indications of authorization among the parties to an interconnection provisioning transaction, the techniques may facilitate faster turnup and provisioning of the interconnection for customers. So long as the ports (or other resources) of the exchange are managed at least in part by the exchange provider, then the customer does not need to purchase for itself a dedicated port nor order any required resources in such cases, for the exchange provider can automatically reserve resources and generate the interconnection token. Once the customer is ready for the interconnection to be created, providing the interconnection token to the interconnection platform indicates authorization from the customer, and the exchange provider can provision the already-reserved resources in the exchange, potentially resulting in the customer receiving interconnection services in minutes rather than days or even weeks. In some cases, the interconnection token is extensible to many different types of resources and can be used to provision virtual gateways, virtual devices, or other resources, which typically are owned and/or managed by the exchange provider.

In some examples, a method includes generating, by an interconnection platform for an exchange, an interconnection token representing authorization for an interconnection to or from a resource of the exchange, wherein the interconnection token comprises a unique identifier and token data for requesting and provisioning an interconnection using the resource. The method also includes outputting a first indication of the unique identifier of the interconnection token. The method also includes provisioning, by the interconnection platform, in response to receiving, from a customer of an exchange provider of the exchange, a second indication of the unique identifier of the interconnection token and based on the authorization, an interconnection in a network device of the exchange, the interconnection including, or connecting to or from, the resource.

In some examples, a system comprises an exchange comprises network resources; and an interconnection platform for the exchange, the interconnection platform comprising processing circuitry and configured to: generate an interconnection token representing authorization for an interconnection to or from a resource of the exchange, wherein the interconnection token comprises a unique identifier and token data for requesting and provisioning an interconnection using the resource; output a first indication of the unique identifier of the interconnection token; and provision, in response to receiving, from a customer of an exchange provider of the exchange, a second indication of the unique identifier of the interconnection token and based on the authorization, an interconnection in a network device of the exchange, the interconnection including, or connecting to or from, the resource.

In some examples, a non-transitory computer-readable storage medium comprises instructions for causing one or more processing circuitry of an interconnection platform to: generate an interconnection token representing authorization for an interconnection to or from a resource of the exchange, wherein the interconnection token comprises a unique identifier and token data for requesting and provisioning an interconnection using the resource; output a first indication of the unique identifier of the interconnection token; and provision, in response to receiving, from a customer of an exchange provider of the exchange, a second indication of the unique identifier of the interconnection token and based on the authorization, an interconnection in a network device of the exchange, the interconnection including, or connecting to or from, the resource.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
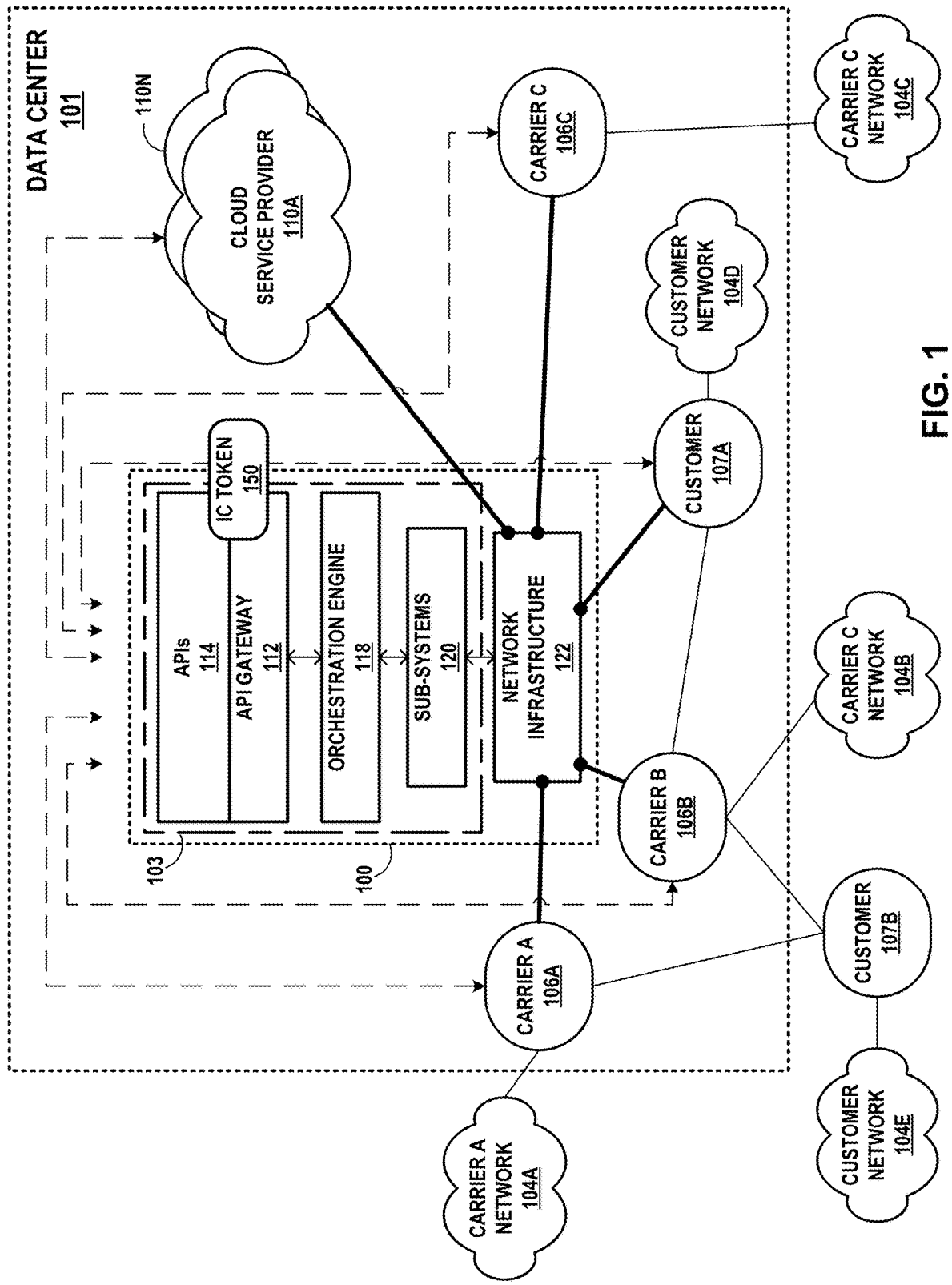
FIG. 1 is a block diagram that illustrates a high-level view of a data center that provides an operating environment for an exchange that implements interconnection token techniques, in accordance with some example implementations described herein.

FIG. 1 is a block diagram that illustrates a high-level view of a data center 101 that provides an operating environment for a cloud-based services exchange 100. Cloud-based services exchange 100 ("cloud exchange 100") allows a corresponding one of customer networks 104D, 104E and carrier networks 104A-104C (collectively, "private networks 104") of any carriers 106A-106C (collectively, "carriers 106") or other cloud customers including customers 107A, 107B to be directly cross-connected, via a virtual layer 2 (L2) or layer 3 (L3) connection to any other customer network and/or to any of cloud service providers 110A-110N (collectively, "CSPs 110"), thereby allowing direct exchange of network traffic among the customer networks and CSPs 110.

Carriers 106 may each represent a network service provider that is associated with a transit network by which network subscribers of the carrier 106 may access cloud services offered by CSPs 110 via the cloud exchange 100. In general, customers of CSPs 110 may include network carriers, large enterprises, managed service providers (MSPS), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 100.

In this way, cloud exchange 100 streamlines and simplifies the process of partnering CSPs 110 and customers (via carriers 106 or directly) in a transparent and neutral manner. One example application of cloud exchange 100 is a co-location and interconnecting data center in which CSPs 110 and carriers 106 and/or customers 107 may already have network presence, such as by having one or more accessible ports available for interconnection within the data center. This allows the participating carriers, customers, and CSPs to have a wide range of interconnectivity options in the same facility. Cloud exchange 100 of data center 101 includes network infrastructure 122 that provides a L2/L3 switching fabric by which CSPs 110 and customers/carriers interconnect. This enables a carrier/customer to have options to create many-to-many interconnections with only a one-time hook up to the switch fabric and underlying interconnection platform 103 of cloud exchange 100. In other words, instead of having to establish separate connections across transit networks to access different cloud service providers or different cloud services of one or more cloud service providers, cloud exchange 100 allows customers to interconnect to multiple CSPs and cloud services using network infrastructure 122 within data center 101.

By being connected to and utilizing cloud exchange 100, customers can purchase services and reach out to many end users in many different geographical areas without incurring the same expenses typically associated with installing and maintaining multiple virtual connections with multiple CSPs 110. Because an interconnection is a connection between two customers of the exchange, the disclosure uses the terms interconnection and connection interchangeably. An interconnection may be a virtual connection.

In some example implementations described herein, cloud exchange 100 includes an interconnection platform 103 that exposes a collection of software interfaces, also referred to herein as application programming interfaces (APIs) 114 in that the APIs 114 define the methods, fields, and/or other software primitives by which applications may invoke the interconnection platform 103. The software interfaces allow carriers 106 and customers 107 programmable access to capabilities and assets of the cloud exchange 100.

On the buyer side, the software interfaces presented by the underlying interconnect platform provide an extensible framework that allows software developers associated with the customers of cloud exchange 100 to create software applications that allow and leverage access to the interconnect platform by which the applications may request that the cloud exchange establish connectivity to cloud services offered by any of the CSPs 110. For example, these buyer-side software interfaces (or "buyer APIs" of APIs 114) may allow customer applications for NSPs and enterprise customers, e.g., to obtain authorization to access the cloud exchange, obtain information regarding available cloud services, obtain active ports and metro area details for the customer, create virtual circuits of varying bandwidth to access cloud services (including dynamic selection of bandwidth based on a purchased cloud service to create on-demand and need based virtual circuits to cloud service providers), delete virtual circuits, obtain active virtual circuit information, obtain details surrounding CSPs partnered with the cloud exchange provider, obtain customized analytics data, and validate partner access to interconnection assets.

On the cloud provider (seller) side, the software interfaces may allow software developers associated with cloud providers to manage their cloud services and to enable customers to connect to their cloud services. For example, these seller-side software interfaces (or "seller APIs" of APIs 114) may allow cloud provider applications to obtain authorization to access the cloud exchange, obtain information regarding available cloud services, obtain active ports and metro area details for the provider, obtain active port details in a given data center for the provider, approve or reject virtual circuits of varying bandwidth to access cloud services created by customers, obtain virtual circuits pending addition and confirm addition of virtual circuits, obtain virtual circuits pending deletion and confirm deletion of virtual circuits, obtain customized analytics data, and validate partner access to interconnection assets.

As further described herein, the APIs 114 facilitate machine-to-machine communication to enable dynamic provisioning of virtual circuits in the cloud exchange for interconnecting customer and provider networks. In this way, the interconnection platform 103 enables the automation of aspects of cloud services provisioning. For example, the software interfaces may provide an automated and seamless way for customers to establish, de-install and manage interconnection with multiple, different cloud providers participating in the cloud exchange.

In some examples, cloud exchange 100 includes an API gateway 112 having one or more processors that executes one or more applications that expose software interfaces defined according to APIs 114. The applications may invoke services that correspond to endpoints of the APIs 114, and the services may themselves invoke the cloud exchange platform service of orchestration engine 118. API gateway 112 may execute on a management device such as one or virtual machines and/or real servers of data center 101. Although shown as a single element in FIG. 1, API gateway 112 may comprise a cluster of one or more physical and/or virtual computing machines executing on one or more physical processors.

In some examples, cloud exchange includes an orchestration engine 118 that organizes, directs and integrates underlying software sub-systems 120 for managing various aspects of interconnection within the network infrastructure 122 as well as cloud services management. The orchestration engine 118 may, for example, provide a rule-drive workflow engine that operates between the APIs 114 and the underlying interconnect platform of cloud exchange 100 that includes sub-systems 120 and network infrastructure 122. In this way, the orchestration engine 118 can be used by customer-proprietary applications and the APIs 114 for direct participation with the interconnection platform 103 of the cloud exchange 100. In other words, the orchestration engine 118 offers a "cloud exchange platform service" having various application engines or workflows to handle the API gateway 112 service requests.

As described in further detail below, sub-systems 120 may offer "cloud exchange services" invokable by orchestration engine 118. Sub-systems 120 and orchestration engine 118 may each be centralized or distributed applications and may execute on a management device such as one or virtual machines and/or real servers of data center 101.

Network infrastructure 122 represents the cloud exchange switching fabric and includes multiple ports that may be dynamically interconnected with virtual circuits by invoking APIs 114 according to techniques described herein. Each of the ports is associated with one of carriers 106, customers 107, or CSPs 110.

In accordance with techniques of this disclosure, interconnection platform 103 manages interconnections in cloud exchange 100 using interconnection tokens. In some cases, a customer, e.g., customer 107B, of the cloud exchange provider may be reluctant to colocate customer equipment within data 101 center that hosts cloud exchange 100 or to purchase a dedicated network port or other assets of network infrastructure 122.

An interconnection token, also referred to herein as a "service token," may include a unique identifier or key that grants, to a customer of an exchange provider, authorization to use or connect to or from an interconnection asset. The interconnection asset may include, for example, a hardware port of a network. Network equipment of the exchange provider may be located within a data center or other interconnection facility, may include one or more ports, and may be configured with configuration data that cause the network equipment to connect customer networks, service provider/carrier networks, and cloud service provider networks to one another via the ports. A hardware port may be a multi-tenant port that may be configured to implement multiple virtual interfaces for communicating on multiple virtual networks, e.g., VLANs.

An interconnection token is identified by the unique identifier, but the interconnection token may be associated with or otherwise indicate various properties or characteristics of the authorization. For example, an interconnection token may be associated with the authorized asset, configuration data for the asset (e.g, port configuration data), constraints on the connectivity permitted to the authorized customer using the asset, contact information for individuals or agents that are to be notified upon access or use of the service token, token metadata, a customer account for a customer that requested the service token, a description of a service (e.g., an interconnection) that is to connect to or from the authorized asset, bandwidth for the service, or other data.

An interconnection token can be shared with a customer by the provider (e.g., reseller, carrier, cloud service provider, or exchange provider) to enable connectivity to or from a shared, multi-tenant port, or other virtual asset. The shared virtual asset may be owned/leased and managed by the asset owner or exchange provider. In some cases, a customer may request, from a provider, authorization to use or connect to or from an interconnection asset. If the provider is the exchange provider, the exchange provider system (e.g., interconnection platform 103) may generate an interconnection token and send the interconnection token to the customer. If the provider is not the exchange provider, the provider may request an interconnection token representing authorization to use or connect to or from an interconnection asset of the provider. The exchange provider system may generate the interconnection token, for delivery to the customer, either directly or via the provider.

Once an interconnection token is generated and shared with the customer, the customer has full authorization, from the provider, to create a connection on the port or other interconnection asset defined by the interconnection token. The provider can obtain information about an interconnection token (e.g., status) or delete an interconnection token at any time. In some cases, interconnection tokens cannot be reused. Once used, a customer will need to request another interconnection token from its provider if needed.

To make use of the authorization, the customer provides the interconnection token to the exchange provider system. The exchange provider system uses the interconnection token to identify the interconnection asset for which authorization is granted. The customer may request, in association with the interconnection token, an interconnection that uses the interconnection asset. In response to the request, the exchange provider system provisions one or more network devices of the exchange with an interconnection that uses or connects to or from the interconnection asset. For example, the exchange provider system may provision a virtual connection, e.g., a virtual circuit, in the network devices of the exchange that terminates at a hardware port owned by the provider that requested the interconnection token to authorize the customer connectivity. In some cases, the exchange is referred to as a "network fabric" or more simply as a "fabric."

For interconnection assets that are ports, the exchange provider system generates an interconnection token for a hardware port owned/leased by a provider, which may be the exchange provider. As noted above, the interconnection token can then be shared with a customer to enable the customer to create a connection using the port. There are multiple types of interconnection tokens available for port connectivity authorizations. These types include A-side interconnection tokens and Z-side interconnection tokens. The A-side interconnection token allows a second customer to authorize a first customer of the exchange provider to create a connection, in one or more network devices of the exchange, between the first customer's port and a port or service of the second customer. Connection with the first customer's port is authorized by the A-side interconnection token.

A Z-side interconnection token allows another new or existing customer to create a connection from a customer or provider's A-side port on the network devices of the exchange to any customer network, provider network, or other destination that is reachable via the network. The Z-side interconnection token in this way allows a customer or provider to invite another customer to create a connection to a port of the customer or provider, using the exchange provider system. The customer or provider authorizing connectivity access at its A-side port may be a network service provider/carrier.

Example systems for implementing interconnection tokens are described further below. While described primarily with respect to a cloud exchange within one or more data centers, the techniques are similarly applicable to other types of exchanges, typically located within data centers or other interconnection facilities, that include network equipment to interconnect different networks.

In addition, while described primarily with respect to interconnection assets that are hardware ports of a network, service tokens for assets of the exchange provider besides interconnection assets are contemplated. For example, a service token generated by the exchange provider in response to a request from a first customer may provide authorization to a second customer to access, configure, use, connect to or from, or perform another operation with respect to a network gateway, network device, virtual network device, or other asset of the exchange provider, or a network service provider. The service token, when presented by the second customer to the exchange provider system, indicates authorization by both the exchange provider and the first customer that the second customer may perform operations with respect to the asset or request that the exchange provider system perform operations with respect to the asset.

Interconnection platform 103 may respond to a request from customer 107B for an interconnection on cloud exchange 100 with an interconnection token 150. As part of generating the interconnection token, interconnection platform 103 may reserve network resources, e.g., in the form of devices, gateways, or interconnection assets (e.g., ports) of cloud exchange 100, for customer 107B and associating the details of the request and of the corresponding reserved resources with an interconnection token. These associations may be stored as data structures in tokens 156 (shown in FIG. 2). The reserved interconnection assets may include attachment circuits (e.g., VLANs) for ports on network infrastructure 122. Cloud exchange 100 includes a network comprising one or more network devices, which may include physical and/or virtual devices.

Interconnection token 150 may represent a data structure that includes token data for requesting an interconnection and provisioning a requested interconnection. Such interconnection data may include the authorized resource, such as a shared port and a corresponding attachment circuit for network infrastructure 122 or a provider port and a corresponding attachment circuit for network infrastructure 122, may include the type of resource reserved, a bandwidth for the interconnection, an expiration date for interconnection token 150, and unique identifier for interconnection token 150, constraints, and other connection parameters and details. As used herein, the term service token or interconnection token may refer, for example, specifically to the unique identifier for such a token or may refer to the token data associated with the token.

Interconnection platform 103 provides interconnection token 150 to customer 107B, which is able to submit interconnection token 150 to interconnection platform 103. Upon successfully validating interconnection token 150, interconnection platform 103 provisions the requested interconnection according to the details specified in interconnection token 150.

Although described with respect to interconnections in a cloud exchange, the techniques described herein may be applied by an interconnection platform to provision interconnections in an Ethernet exchange, internet exchange, provide direct connectivity to the internet, or otherwise provision, based on an interconnection token, an interconnection to connect customer-associated equipment to another network.

Figure 2:
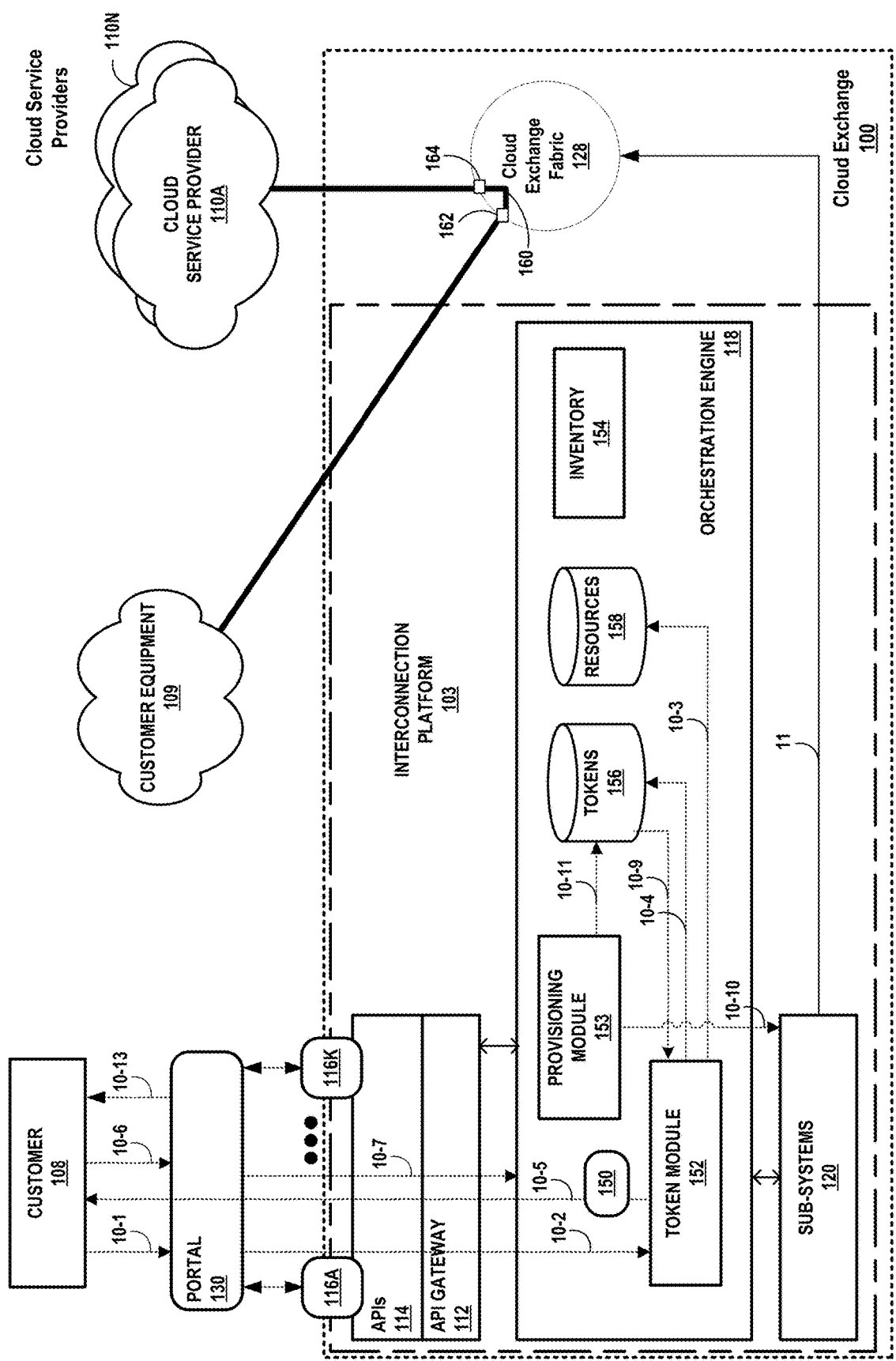
FIG. 2 is a block diagram that illustrates an exchange that implements interconnection token techniques, in accordance with some example implementations described herein.

FIG. 2 is a block diagram that illustrates an exchange that implements interconnection token techniques, in accordance with some example implementations described herein. In this example architecture, cloud exchange 100 includes a cloud exchange fabric 128. Cloud exchange fabric 128 is provisioned with interconnections that interconnect ports of the network devices (or ports of the cloud exchange fabric 128 coupled to ports of the network devices) in order to connect customers of the cloud exchange 100 provider. Cloud exchange fabric 128 may be located within a single data center or may be metro-based, in that cloud exchange fabric 128 represents switching fabric distributed across multiple data centers geographically located in a single metropolitan area, the multiple data centers connected to one another by high-speed connections. These data centers may be referred to as "cloud exchange points." Cloud exchange fabric 128 may represent an example instance of network infrastructure 122 of FIG. 1.

Additional details of a cloud exchange are described in U.S. patent application Ser. No. 15/099,407, filed Apr. 14, 2016 and entitled "CLOUD-BASED SERVICES EXCHANGE;" U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 14/927,306, filed Oct. 29, 2015 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

Applications developed and deployed by the exchange provider, CSPs 110, NSPs 106, and customers 108 invoke APIs 114 of interconnection platform 103 to, for example, automatically control provisioning and manage aspects of cloud exchange 100 for aspects of interconnection with one or more cloud providers/customers, including: (1) provisioning of interconnections, (2) identification and authorization of carriers, (3) management and fulfillment of orders, (4) delivery of network services, (5) managing inventory and capacity, (6) managing and reporting/alerting incidents, (7) content management, and (8) requesting resources using interconnection tokens.

Figure 5:
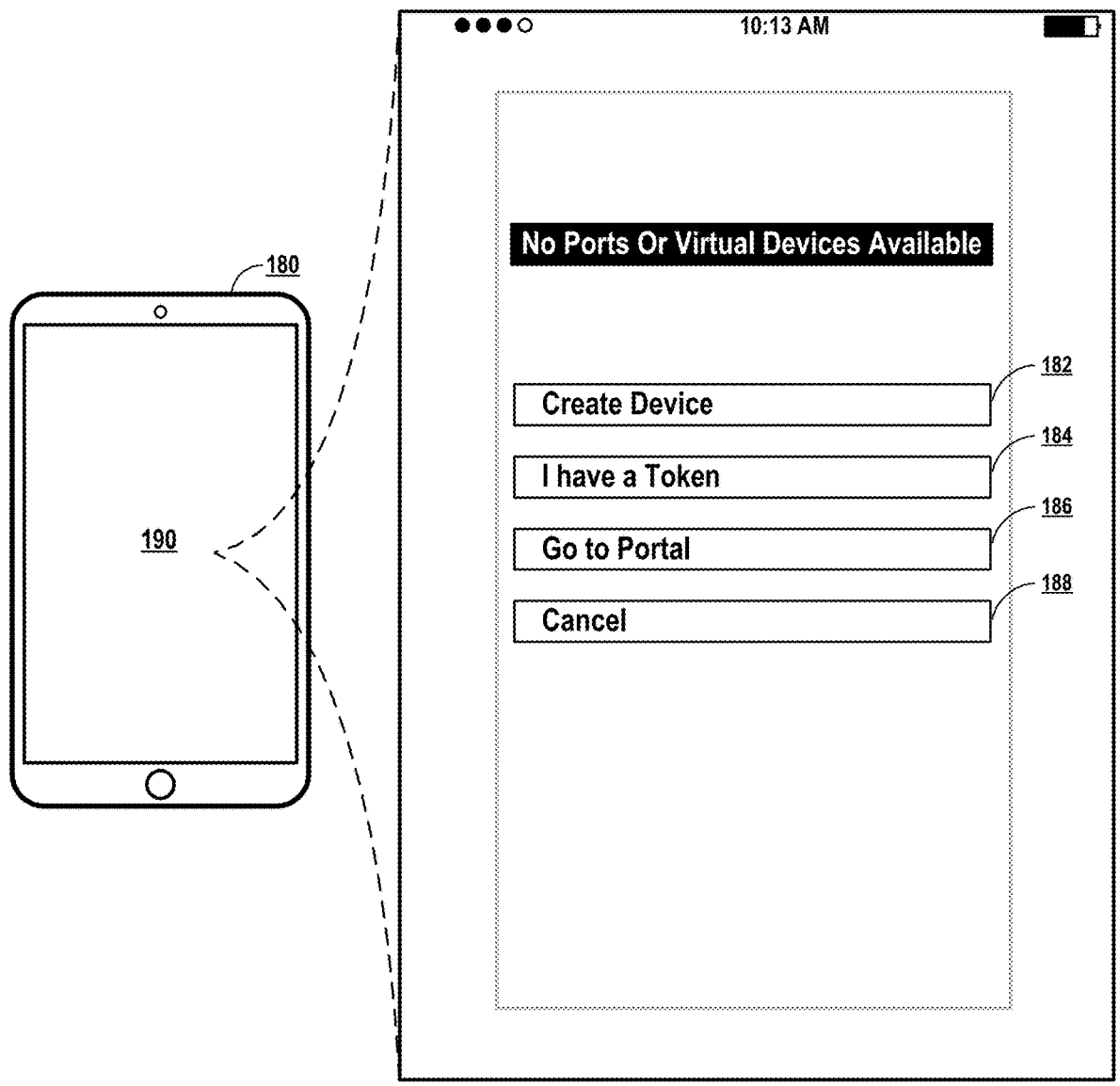
FIG. 5 is a block diagram depicting an example computing device for displaying a user interface, in accordance with techniques described herein.

Portal 130 is an example of an application that can invoke APIs 114. Portal 130 may represent a standalone application or a web application that outputs webpages for display on a web browser. As an example, FIG. 5 illustrates an example computing device 180 having a web browser 190 to display user interface for display. In response to user input to portal 130 user interfaces of the webpages, portal 130 may invoke APIs 114 to request information for output via the webpages or to cause interconnection platform 103 to provision cloud exchange fabric 128, for instance. Other user interfaces are depicted in FIGS. 9A-9C, 10A-10C, and 11A-11D.

In this example, APIs 114 includes endpoints 116A-116K (collectively, "endpoints 116") that each represents a resource exposed by interconnection platform 103. Applications 130 may interact with API gateway 112 according to client/server model. Applications, such as portal 130, may send a request directed to any of endpoints 116 of APIs 114. API gateway 112, in response to requests, invokes the cloud exchange platform service of orchestration engine 118, which may orchestrate a workflow of service tasks for the underlying sub-systems 120 to satisfy the request. In response to the request, e.g., upon completion of the workflow, API gateway 112 may send a response to the requesting application from the endpoint 116 invoked.

In some examples, APIs 114 may conform to a Representational State Transfer model, i.e., be a RESTful interface, with endpoints 116 representing different methods of the RESTful interface. Applications may invoke any of endpoints 116 using a communication protocol for transferring application data (e.g. HTTP) that specifies the method, a resource Uniform Resource Identifier (URI), and optionally parameters for the method. API gateway 112 translates the resource URI and the optional parameters to cloud exchange platform-related constructs and invokes the cloud exchange platform of orchestration engine 118 according to one of a create, read, update, and delete (CRUD) or confirmation action corresponding to the endpoint 116 specified by the application data. In HTTP parlance, the create action corresponds to the POST method, read to the GET method, and confirmation to the PATCH method, for example.

Sub-systems 120 may apply the service tasks orchestrated by orchestration engine 118, which may include modifying cloud exchange fabric 128 to perform the on-demand setup of virtual circuits between CSPs 110 and customer networks or equipment, or between different customer networks or equipment, or otherwise manage cloud exchange fabric 128 interconnection assets such as ports, metros, data centers, virtual circuits and virtual circuit bandwidth, profiles, and configuration. Virtual circuits are an example of an interconnection.

Customer equipment 109 may include a physical or virtual device associated with customer 108. Customer equipment 109 may be colocated in a data center that houses cloud exchange fabric 128. For example, customer equipment 109 may be physical network, storage, and/or computing equipment deployed by customer 108 within a colocation space leased by the customer within a data center that includes cloud exchange 100. As another example, customer equipment 109 may be a virtual device instantiated on computing infrastructure, such as Network Function Virtualization Infrastructure, and assigned to customer 108. In such an example, the virtual device may apply a network function, such as a firewall, router, load balancer, or network address translation, to data traffic.

On-demand setup of interconnections in a cloud exchange by an interconnection platform is described in U.S. patent application Ser. No. 14/927,451. In order to create and use an interconnection provisioned by the cloud exchange 100 provider, however, a customer must have a resource to which the virtual circuit can connect (or that the virtual circuit is to interconnect to another resource, e.g., belonging to a cloud service provider). Examples resources may include a shared network port of cloud exchange fabric 128 that can be shared by multiple customers and is managed by the cloud exchange provider; a network port of cloud exchange fabric 128 that is owned by a network service provider or other service provider and yet is managed by the cloud exchange provider; another network port; an internet exchange or ethernet exchange port similar to those just described; a virtual device (e.g., a virtualized network function); or a virtual gateway. In the example of FIG. 2, customer resource 109 may be an example of a resource to which an interconnection is to connect. Additional description of virtual devices and virtual gateways are found in U.S. patent application Ser. No. 16/836,777, filed Mar. 31, 2020; and U.S. Patent Application No. 63/025,352; each of which is incorporated by reference herein in its entirety.

In accordance with techniques of this disclosure, a customer may request a resource and the interconnection platform may provision the resource based on a provisioning workflow 10 that uses an interconnection token. At step 10-1 of workflow 10, an agent of customer 108 uses portal 130 to request a port 162 of cloud exchange fabric 128, which is managed by the cloud exchange provider, to connect to cloud service provider 110A. Port 162 may output one or more user interfaces by which the agent of customer 108 can set details of the request, such as desired bandwidth.

In response to the request, portal 130 at step 10-2 invokes endpoint 116A of APIs 114 to request an interconnection token. An example of endpoint 116A is https://{host}/fabric/version/serviceTokens.

An example request for step 10-2 with a JavaScript Object Notation (JSON) format for data exchanged via endpoint 116A is below:
POST: https://{host}/fabric/version/serviceTokens
REQUEST:

---

```
{
  "resource": {
    "type": "cx_port | ec_port | ee_port | loa | evg | vd", // Resource (referred to elsewhere in this
    disclosure as "asset") on which service tokens are being created: cloud exchange port
    (cx_port), Internet connection port (ec_port), ethernet exchange port (ee_port), letter of
    authorization (loa), virtual gateway (evg), or virtual device (vd). A service token is
    primarily described in this disclosure for an interconnection that utilizes the resource 'on
    which' the service token is created.
```

```
"uuid": "87c8c709-2a98-a980-d2e0-30acc952ff5d", // Unique identifier of the resource
"hidden": false, // Can the customer see the resource details as the resources are owned by
Exchange Provider or Vendors
"reusable" : false, // Can the service token be reused after the token is deleted or after
resources are deleted
"expiration": 20, //Number of days after which the service token will be expired
"encryptionMethod": "AES" | "None", //Encryption method to use when persisting the
token details if needed
"metadata": {
"outerTag": 5, //Resource Configurations set by Exchange Provider or Vendor for
enterprise customer
"innerTag": 1014, // Resource Configurations set by Exchange Provider or Vendor for
enterprise customer
"speedLimit": 10000, // Resource Limitation set by Exchange Provider or Vendor for
enterprise customer
"allowRemoteConnections": //Resource Limitation set by Exchange Provider or Vendor for
enterprise customer
        }
},
"notify": { //Notification contacts for any updates on Service Tokens (Used, Updated,
Deleted, Expiration alerts)
"emailIds: [
   "net.new.customer@exchangeprovider.com",
   "vendor@vendor.com",
   "any.email@any.enterprise.com"
],
"mobiles": [
  {
   "countryCode": 1,
   "number": 6692146657
  },
  {
   "countryCode": 91,
   "number": 8885019922
  }
  ]
  }
```

An example response message for step 10-5 with a JavaScript Object Notation (JSON) format for data exchanged via endpoint 116A is below:
RESPONSE:
{
"uuid": "UUID-{MetroCode}-{1|2}", (Ex: c1b5869b-38a0-4c33-b9d6-b747d008a1dc-DC-1)
"status": "INACTIVE" (Goes to ACTIVE state when this service token is used and goes to EXPIRED if unused before expiration period)
}

Another example request for step 10-2 with a JavaScript Object Notation (JSON) format for data exchanged via endpoint 116A is below:
POST: https://{host}/fabric/version/serviceTokens
REQUEST:

```
{
  "type": "VC_TOKEN", // type of service token. Here, Virtual Circuit (VC) Token.
  // A virtual circuit is a type of (inter)connection and this example request
  // therefore uses a type of interconnection token.
   "issuerSide": "A_Side",
   "connection": {
    "type": "EVPL_VC", // type of connection
    "bandwidthLimit": 5000,
    "allowRemoteConnection": true,
    "aSide": {
      "accessPointSelectors": [
        {
         "type": "COLO",
         "hideAssetInfo": false,
         "port": {
           "uuid": "c4d85dbe-f93b-93b9-f7e0-306a5c00af26"
         },
```

-continued

```
      "linkProtocol": {
        "type": "DOT1Q",
        "vlanTag": "1001"
      }
    }
   ]
  }
 },
 "expiry": 30,
 "notifications": [
  {
   "type": "EMAIL",
   "emails": [
     "sample@company.com"
   ]
  }
 ]
}
```

Every connection may have an A-Side and a Z-Side that are connected through the networking devices of the exchange. In general, Access Points are those sides that are connectable. Here, service tokens are created for COLO/Port as one of accessPointSelectors. Other example access points/assets may include virtual gateways, routing instances, virtual devices, or other examples described elsewhere in this description. The following tables describes attributes of the above example requests.

| Attributes | Required | Example Value | Description |
|---|---|---|---|
| type | Yes | VC_TOKEN | Type of the service token. I this example, it is a virtual circuit via port. Other examples may be for other types of assets. |
| issuerSide | No | A_Side | |
| connection.type | Yes | EVPL_VC EPL_VC | Type of connection (VLAN based or Untagged-No VLAN based) |
| bandwidthLimit | No | 1000 (1 Gbps) | If not specified, defaulted to port's capacity |
| allowRemoteConnection | No | true | Defaulted to Yes to allow remote connections |
| aSide.accessPointSelectors[*].type | Yes | COLO VG | Type of the accessPoint to be authorized. accessPointSelectors is an array; can specify multiple. |
| aSide.accessPointSelectors[*].hideAssetInfo | No | | |
| aSide.accessPointSelectors[*].port.uuid | Yes | Some uuid | Unique identifier of the port |
| aSide.accessPointSelectors[*].linkProtocol.type | Yes | DOT1Q QINQ | Encapsulation Type |
| aSide.accessPointSelectors[*].linkProtocol.vlanTag | Yes | 1001 | Any unique number between 2 to 4094 |
| expiry | No | 30 | Defaulted to 30 days |
| notifications[*].type | Yes | EMAIL | Type of Notification. Email, Mobile, etc. |
| Notifications[*].emails[*] | Yes | example@company.co | Email ID of the token recipient or whoever wants to get notified on usage |

While the previous example request is for an A-side interconnection token, a request for a Z-side interconnection token would be similar, with adjustments to indicate a Z-side for the issuer. Another example response message, to the previous request message, for step 10-5 with a JavaScript Object Notation (JSON) format for data exchanged via endpoint 116A is below:

RESPONSE:
```
{
  "href": "http://{host}/v4/serviceTokens/c97b5278-2cf5-4d57-87e9-5d16115ffac5", //URL/URI for the service token
  "type": "VC_TOKEN",
  "uuid": "c97b5278-2cf5-4d57-87e9-5d16115ffac5",
  "status": "INACTIVE",
```

```
"config": {
  "expiry": 30,
  "connection": {
    "type": "EVPL_VC",
    "config": {
      "allowRemoteConnection": true,
      "bandwidthLimit": 1000,
      "aSide": {
        "accessPointSelectors": [
          {
            "type": "COLO",
            "config": {
              "port": {
                "uuid":      "66284add-7f99-f990-b4e0-
                  30ac094f8af1"//unique id for the asset/resource
              }
            }
          }
        ],
        "linkProtocol": {
          "type": "DOT1Q",
          "config": {
            "vlanTag": 123
          }
        }
      }
    }
  },
  "notifications": [
    {
      "type": "NOTIFICATION",
      "emails": [
        "name1@company1.com",
        "name2 @company2.com"
      ]
    }
  ],
  "account": {
    "orgId": "7033"
  },
  "changeLog": {
    "createdBy": "739693",
    "createdDateTime": "2021-01-01T20:23:34.898Z"
  }
}
```

In the above example, the service token is for a connection, more specifically, a connection that is an Ethernet Virtual Private LAN (EVPL) service. As such, the service token is an interconnection token that authorizes creation, responsive to a request from the customer that obtains the service token, of an interconnection to an access point that is an asset associated with cloud exchange 100. In the above example, the asset is a hardware port of cloud exchange 100; this is indicated in the accessPointSelectors container of the JSON data of the request by the "COLO" type, which stands for colocation port and is a hardware port of the cloud exchange 100 network. The unique identifier for the port is also specified, as is a unique identifier for the service token. In some examples, the unique identifier for the service token may be generated by interconnection platform 103 and included in the response if the request for a service token is successful. Other types of connections include Multiprotocol Label Switching (MPLS), E-LAN, IP-VPN, Ethernet Private LAN, and/or Internet. Any of these may be considered "virtual circuits".

The accessPointSelectors container in a request for a service token can specify any of multiple different types of access points. In general, an access point is the interconnection asset at which customer assets can access networks and services provided by other customers and services coupled to the cloud exchange. Types of access points may include ports, gateways, virtual devices, or other asset of the exchange provider, or a network service provider. The above example also indicates the type of service token is "aSide" (A-side service token). Accordingly, this service token may be used, by a first customer of the exchange provider, to create a connection from an A-side of the first customer of the exchange provider to a port or service of the second customer for which authorization and the service token were provided, responsive to a request from the second customer that owns/leases the port or provides the service.

In some cases, a request for a service token can indicate constraints on the connectivity permitted to the customer using the authorized asset. This allows the provider that is authorizing use of the asset by the customer to set limitation on how the asset can be used. For example, the request for a service token may specify, e.g., one or more destinations/locations/data centers, services, or other customers that the customer may connect to using the authorized asset. By default, non-specified destinations/locations/data centers, services, or other customers would not be permitted as endpoints of the connection.

Contrariwise, the request for a service token may specify, e.g., one or more destinations/locations/data centers, services, or other customers to which the customer is not allowed to connect to using the authorized asset. By default, non-specified destinations/locations/data centers, services, or other customers would be permitted as endpoints of the connection. Interconnection platform 103 enforces these constraints when validating a service token provided by the customer as an indication of authorization, when the customer is requesting a connection.

Token module 152 of orchestration engine 118 receives an indication of the request message and allocates resources from resources 158 of cloud exchange 100. This may include assigning a port, assigning an attachment circuit (e.g., VLAN or VxLAN) for the port, assigning a virtual device, assigning a virtual gateway, allocating a bandwidth for the port, and so forth. Token module 152 at step 10-3 reserves the resources by, e.g., marking them in a database or inventory of resources 158, or by adding an entry to a resource reservation database for resources 158, for instance.

Token module 152 then generates interconnection token 150. Interconnection token 150 is a data structure that may specify one or more of the following: a resource reserved for the requested resource type, a unique identifier for the resource (e.g., a port identifier) a unique identifier for the token, whether details of the resources are hidden/visible to customer 108, an expiration date or number of days until the interconnection token expires, configuration information for the resource (e.g., attachment circuit, encapsulation type, bandwidth, etc.), whether the interconnection token is reusable. Interconnection token 150 may include other data. At step 10-4, token module 152 stores interconnection token 150 to tokens database 156. Types of resources/assets listed in the first example request body above include cloud exchange port ("cx_port"), direct connect port ("ec_port"), ethernet exchange port ("ee_port"), letter of authorization ("loa"), virtual gateway ("evg"), and virtual device ("vd").

APIs 114 at step 10-5 may respond to the initial request from portal 130 with a response message that includes interconnection token 150 or a unique identifier that references interconnection token 150. The above RESPONSE including uuid "c1b5869b-38a0-4c33-b9d6-b747d008a1dc-DC-1" or RESPONSE including uuid "c97b5278-2cf5-

4d57-87e9-5d16115ffac5" may each be an example of a response message from APIs 114 with a unique identifier for interconnection token 150. In some examples, at step 10-5, token module 152 sends an email message or other notification message (e.g., to the notification address included in the REQUEST (e.g., any.email@any.enterprise.com in the above example)) that includes interconnection token 150 or a unique identifier that references interconnection token 150. This message may also include an invoice for the use of the requested resource, in this case, a port 162 owned and managed by the cloud exchange provider. Using the URI/URL for a service token, it is possible to use HTTP GET to obtain the token data or to use HTTP DELETE to delete the service token.

Figure 4:
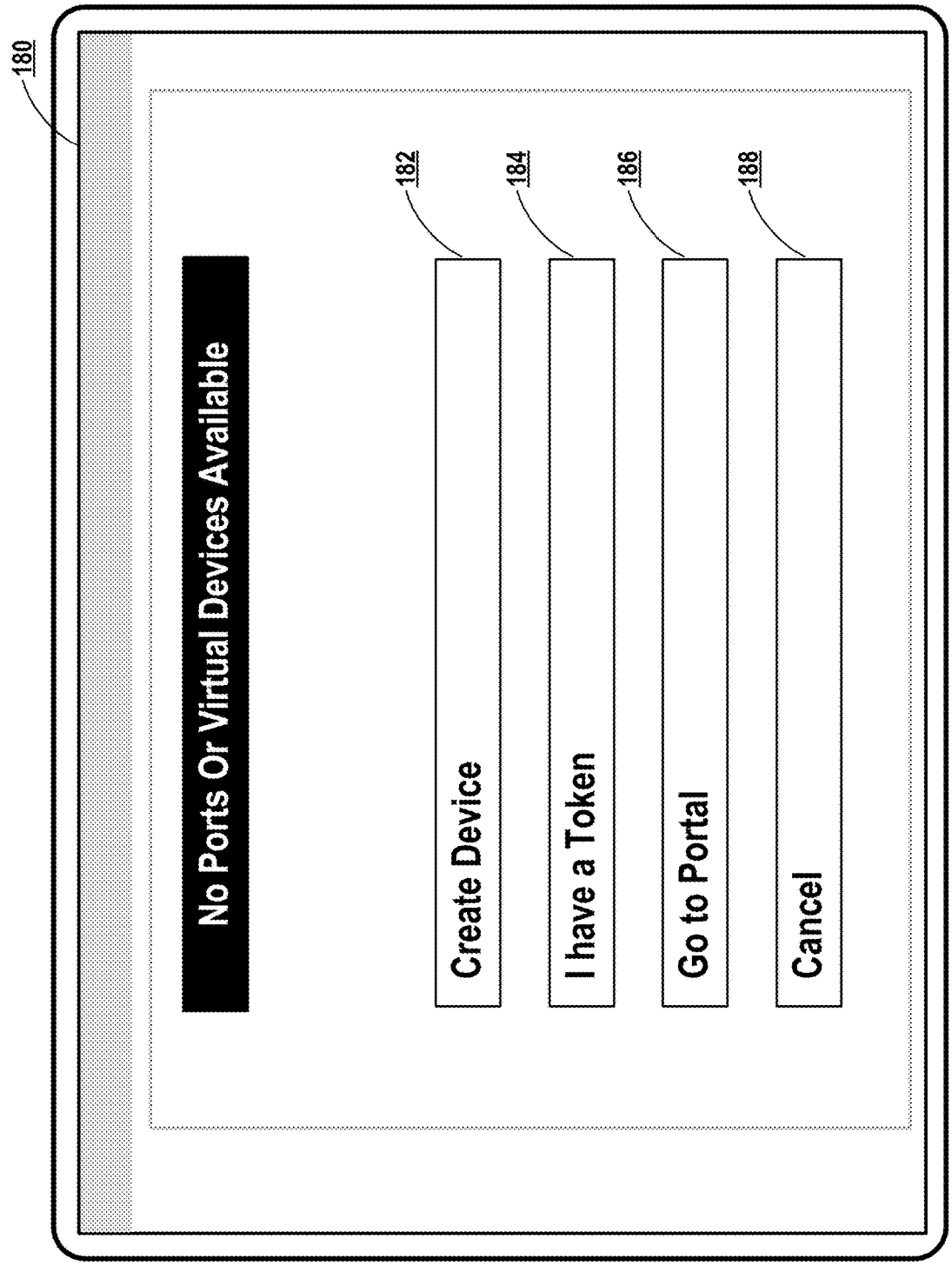
FIG. 4 is a block diagram depicting an example user interface, in accordance with techniques described herein.

Customer 108 at step 10-6 once more uses portal 130 to provision the resource using interconnection token 150. Customer 108 may optionally create a new account with the cloud exchange provider. As an example, user interface 180 of FIG. 4 depicts an example interface displayed to an agent customer 108. The agent may select user element 184 and either upload the interconnection token 150 or provide the unique identifier for interconnection token 150. Portal 130 relays this indication of the interconnection token 150 to orchestration engine 118 via APIs 114 at step 10-7 of FIG. 2. In another user interface (not shown), the agent may select which one of cloud service providers 110 the customer desires to connect to using the resource authorized by the token. An indication of the selected cloud service provider 110 (cloud service provider 110A in this example) is sent to orchestration engine 118.

Based on indication of the interconnection token 150, orchestration engine 118 reads token data from token database 156 and validates interconnection token 150 at step 10-9. For example, if the token is expired, it is invalid. As another example, the token data may indicate constraints on the connectivity permitted to the customer using the authorized asset. Based on the constraints and the requested connectivity, orchestration engine 118 may permit or deny a requested connection using the resource authorized for customer access by the provider.

Token data may be returned to portal 130 for display to customer 108. Based on whether interconnection token 150 specifies that some details for the interconnection are hidden, token data may or may not include specific details about a provider port or attachment circuit for example. (The cloud exchange provider or network service provider may not want to reveal this information to customers.)

Provisioning module 153 at step 10-10 invokes subsystems 120 to configure the interconnection with configuration data 11. This may include configuring the allocated port with an attachment circuit, as indicated in configuration information for the resource in interconnection token 150. This may also include provisioning the interconnection 160 in cloud exchange fabric 128 to connect cloud service provider 110A to the allocated port. In this way, provisioning module 153 realizes the interconnection specified and uses previously-reserved resources automatically reserved and associated with an interconnection token 150 that functions as implicit authorization for the cloud exchange provider, any network service provider (as described further below), and the customer. Provisioning module 153 at step 10-11 marks the token as used in token database 156.

Figure 6:
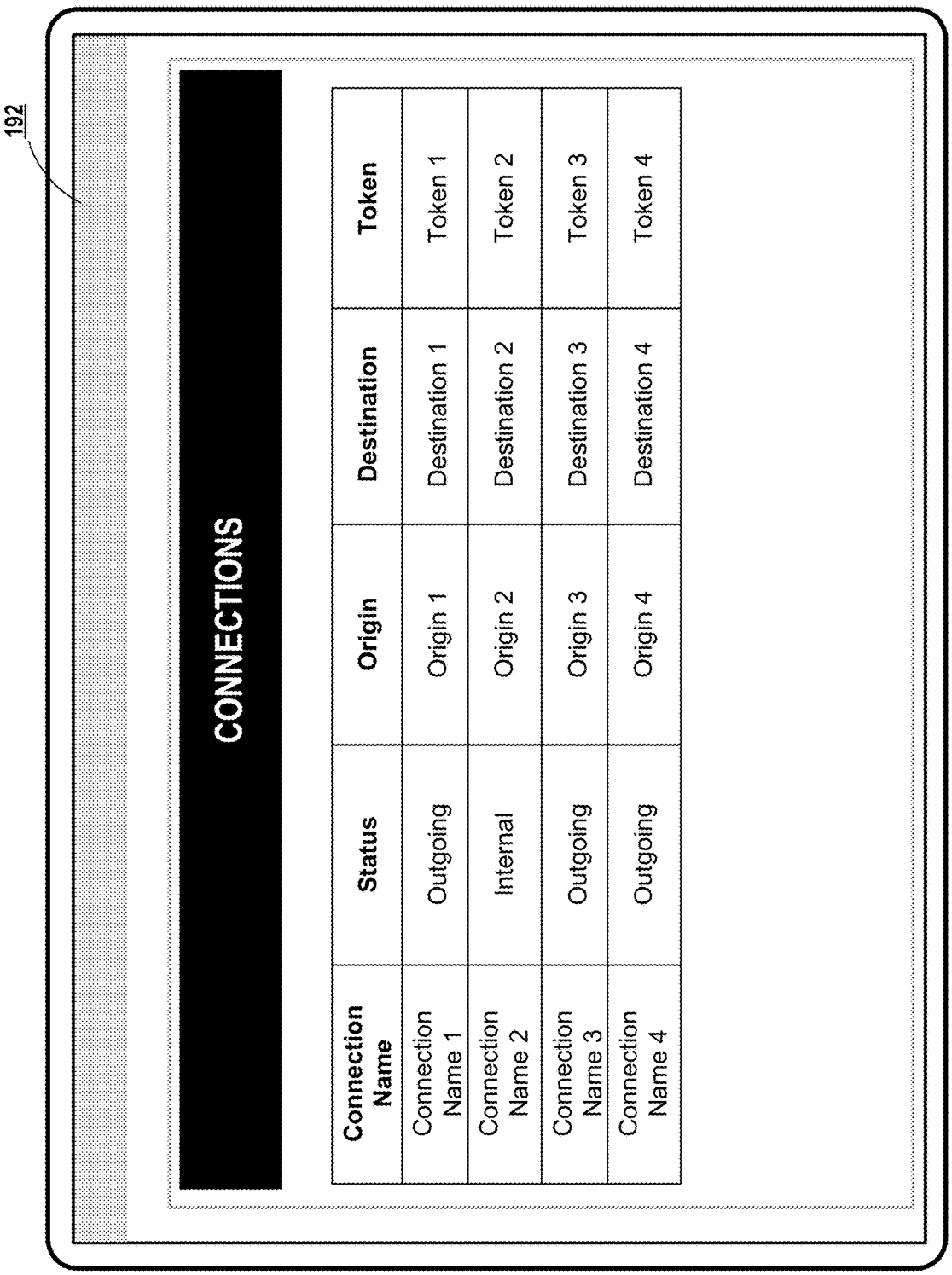
FIG. 6 is a block diagram depicting an example user interface, in accordance with techniques described herein.

Provisioning module 153 may update inventory 154 with a record for the interconnection. As an example, user interface 192 in FIG. 6 illustrates an example user interface output by portal 130 for display to an agent of customer 108 or to another user of portal 130. User interface 192 depicts multiple interconnections and the interconnection tokens used to create the interconnections. Even though the customer does not own the port, the agent is able to view some details about the connection, including its status, origin, and destination. However, if the corresponding interconnection token specifies that some configuration information is to be hidden, the information is not displayed by user interface 192.

Figure 3:
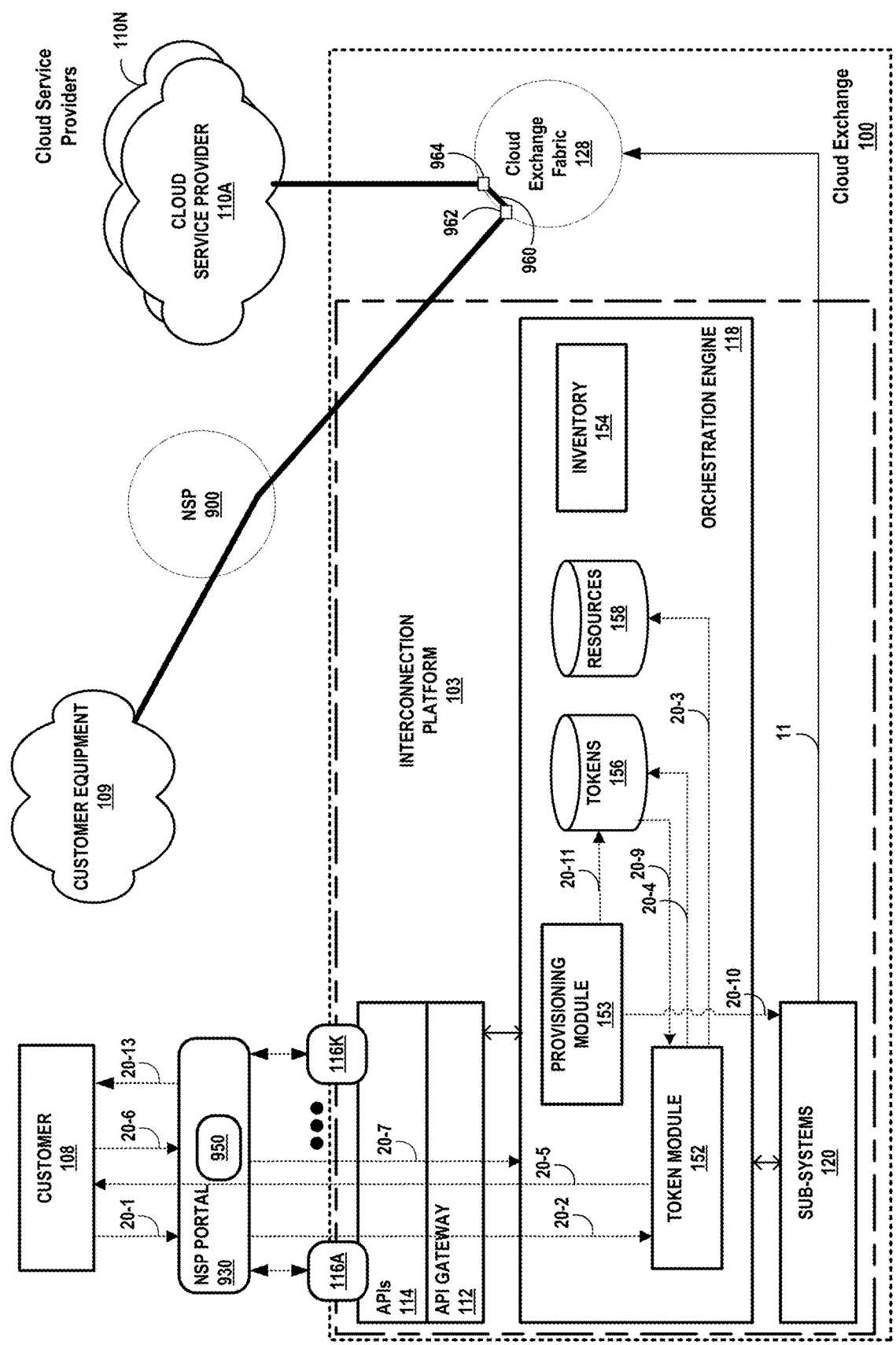
FIG. 3 is a block diagram that illustrates an exchange that implements interconnection token techniques, in accordance with some example implementations described herein.

FIG. 3 is a block diagram that illustrates an exchange that implements interconnection token techniques, in accordance with some example implementations described here. The example system of FIG. 3 is similar to that depicted in FIG. 2, but in FIG. 3 a network service provider mediates both the interconnection and the interconnection setup.

Network service provider (NSP) 900 represents a network service provider network for a network service provider that customer 108 contracts with for connectivity. The network service provider owns port 962 on cloud exchange fabric 128, but port 962 may be managed by the cloud exchange provider. NSP portal 930 may be similar to portal 130 of FIG. 2 but is deployed and operated by the network service provider for NSP 900.

In accordance with techniques of this disclosure, customer 108 may request an interconnection to one of cloud service providers 110 using its connectivity through NSP 900, and NSP portal 930 and cloud exchange 100 implement a workflow to provision the interconnection based on an interconnection token.

The workflow 20 is similar to workflow 10 of FIG. 2, with direct correspondence between steps 10-1 and 20-1, 10-2 and 20-2, and so forth. Interconnection token 950 is similar to interconnection token 150. Workflow 20 differs from workflow 10 in that NSP portal 930 may in some cases generate interconnection token 950 using token data received from token module 152 and/or token data that the NSP selects. For example, the NSP may determine the selected port (port 962 in this example) and corresponding attachment circuit configuration information (e.g., VLAN configuration) for the port for configuring the resource for customer 108. This port and attachment circuit may be selected by the NSP based on its own needs or resource availability. The NSP ensures that NSP 900 is configured to connect customer equipment 109 to the port 962 in order to use the interconnection 960 (e.g., a virtual circuit) with cloud service provider network 110A. NSP 900 may be configured with an EVPN, label switch path, or other virtual connection to achieve this connectivity.

However, in some cases, token module 152 generates interconnection token 950 as described with respect to interconnection token 150.

Workflow 20 also differs from workflow 10 in that interconnection platform 103 outputs the invoice for the purchased resource, an interconnection at port 962, to the NSP because the NSP owns port 962. The NSP may in turn invoice customer 108 for the use of its port 962.

Figure 7:
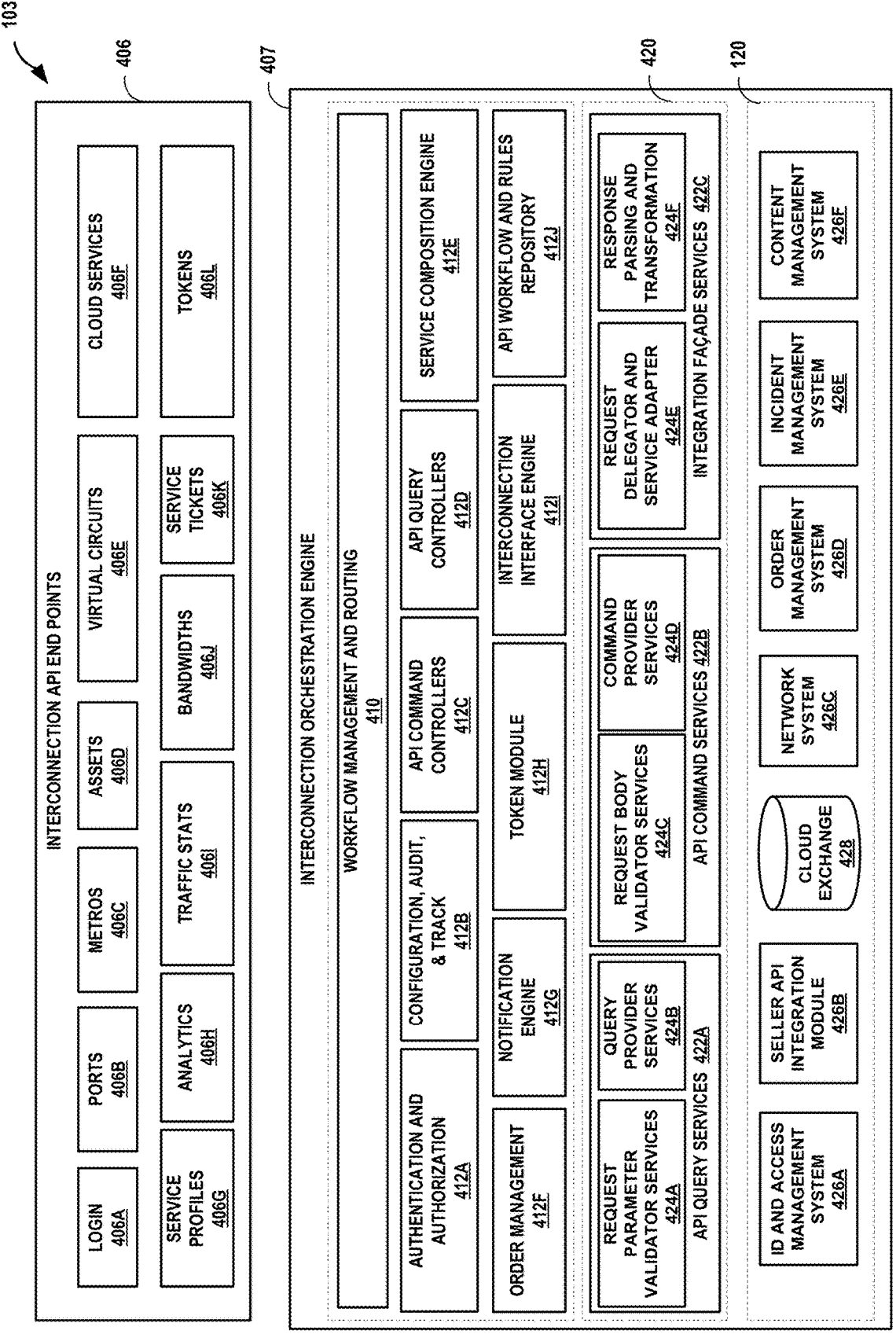
FIG. 7 depicts an example interconnection platform, in accordance with techniques of this disclosure.

FIG. 7 depicts an example interconnection platform, in accordance with techniques of this disclosure. In this example, API gateway 112 exposes an API having multiple endpoints 406A-406L (collectively, "endpoints 406") by which API consumers may manage cloud exchange interconnections. The API gateway, in turn, invokes the orchestration engine 407, which may orchestrate a workflow of service tasks.

Endpoints 406 represent available logical and/or physical resources accessible to API consumers. That is, API consumers may access endpoints 406 to access the interconnection platform of a cloud exchange to get information regarding, create, modify, delete, and/or confirm requests for corresponding resources of the cloud exchange. Endpoints 406 may represent example instances of endpoints 116 of FIGS. 2 and 3.

In this example, endpoints 406 include login 406A, ports 406B, metros 406C, assets 406D, virtual circuits 406E, cloud services 406F, service profiles 406G, analytics 406H, traffic statistics 406I, bandwidths 406J, service tickets 406K, and tokens 406L. In general, API consumers may invoke any of endpoints 406 using a corresponding method and, in some cases, parameters that determine how the interconnection platform executes the method.

Endpoints 406 may represent different methods of a RESTful interface. API consumers may invoke any of endpoints 406 using a communication protocol for transferring application data (e.g. HTTP) that specifies the method, a resource URI, and optionally parameters for the method. The API gateway translates the resource URI and the optional parameters for the endpoint 406 to cloud exchange platform-related constructs and invokes the cloud exchange platform of orchestration engine 407 according to one of a create, read, update, delete, or confirmation action corresponding to the endpoint 406 specified by the application data.

Endpoint tokens 406L may represent an example of the https://{host}/fabric/version/serviceTokens described above with respect to FIGS. 2 and 3.

In this example, the technical architecture for interconnection platform 103 includes an API services layer 420 for validating and satisfying API queries, validating and satisfying API commands, and integrating subsystems 120 with the interconnection orchestration engine 407. One or more real servers and/or virtual machines of a data center may execute each of interconnection orchestration engine 407, services of API services layer 420, and sub-systems 120. Interconnection API endpoints 406 are example API endpoints by which API consumers may manage cloud exchange interconnections.

Token module 412H may represent an example of token module 150 of FIGS. 2 and 3. Cloud exchange 428 may be a database that stores resources 158, tokens 156, and inventory 154. Network system 426C may implement provisioning module 153.

Figure 8:
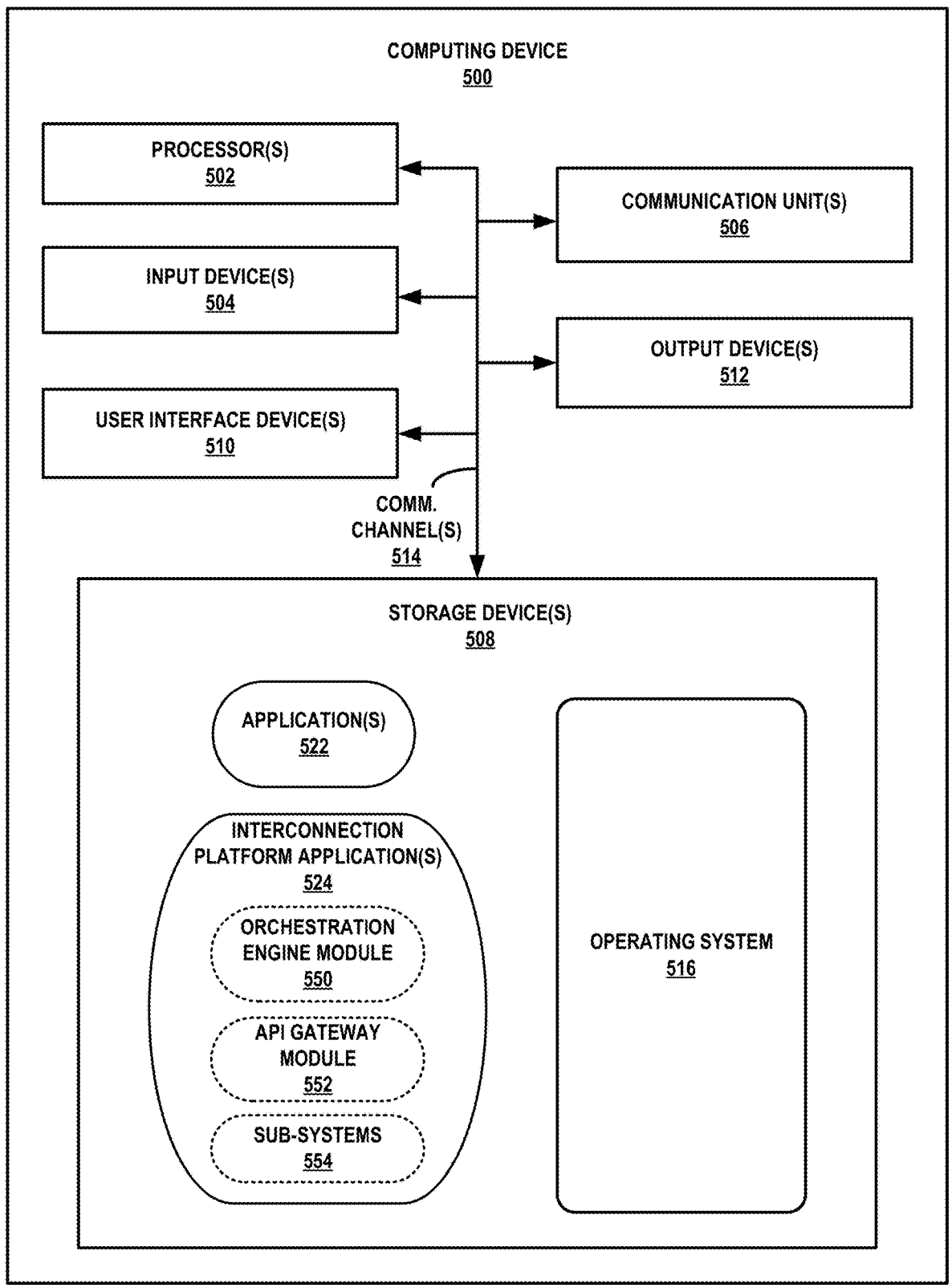
FIG. 8 is a block diagram illustrating further details of one example of a computing device that operates in accordance with one or more techniques of the present disclosure.

FIG. 8 is a block diagram illustrating further details of one example of a computing system that operates in accordance with one or more techniques of the present disclosure. FIG. 8 may illustrate a particular example of a server or other computing device 500 that includes one or more processor(s) 502 for executing any one or more of API gateway 112, orchestration engine 118/407, sub-systems 120, or any other computing device described herein. Other examples of computing device 500 may be used in other instances. Although shown in FIG. 8 as a stand-alone computing device 500 for purposes of example, a computing device may be any component or system that includes one or more processors or other suitable computing environment for executing software instructions and, for example, need not necessarily include one or more elements shown in FIG. 8 (e.g., communication units 506; and in some examples components such as storage device(s) 508 may not be colocated or in the same chassis as other components). Computing device 500 may be located and execute, for example, within any of cloud exchange points 128, another interconnection facility, or at a branch office or cloud computing environment employed or used by a cloud exchange provider.

As shown in the specific example of FIG. 8, computing device 500 includes one or more processors 502, one or more input devices 504, one or more communication units 506, one or more output devices 512, one or more storage devices 508, and user interface (UI) device 510, and communication unit 506. Computing device 500, in one example, further includes one or more applications 522, virtual concept-building application 524, and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G and WiFi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 and interconnection platform application(s) 524 with processors 502, communication unit 506, storage device 508, input device 504, user interface devices 510, and output device 512.

Application 522 and interconnection platform application(s) 524 may also include program instructions and/or data that are executable by computing device 500. Example interconnection platform application(s) 524 executable by computing device 500 may include any one or more of orchestration engine module 550, API gateway module 552, and sub-systems 554, each illustrated with dashed lines to indicate that these may or may not be executable by any given example of computing device 500.

Orchestration engine module 550 may include instructions for causing computing device to perform one or more of the operations and actions described in the present disclosure with respect to orchestration engine 118 and orchestration engine 407. As one example, orchestration engine module 550 may include instructions that cause computing device 500 to organize, direct and integrate underlying software sub-systems of the interconnection platform for a cloud exchange for managing various aspects of interconnection within the network infrastructure as well as cloud services management. The orchestration engine module 550 may, for example, provide a rule-drive workflow engine that operates between the APIs and the underlying interconnect platform of a cloud exchange that includes sub-systems and network infrastructure.

API gateway module 552 may include instructions for causing computing device to perform one or more of the operations and actions described in the present disclosure with respect to API gateway 112 and API gateway 403. As one example, API gateway module 403 may include instructions that cause computing device 500 to expose a collection of software interfaces, e.g., APIs 114, that define the methods, fields, and/or other software primitives by which applications may invoke the interconnection platform. These software interfaces allow carriers and customers programmable access to capabilities and assets of a cloud exchange.

Sub-systems 554 may include instructions for causing computing device to perform one or more of the operations and actions described in the present disclosure with respect to sub-systems 120.

Figure 9A:
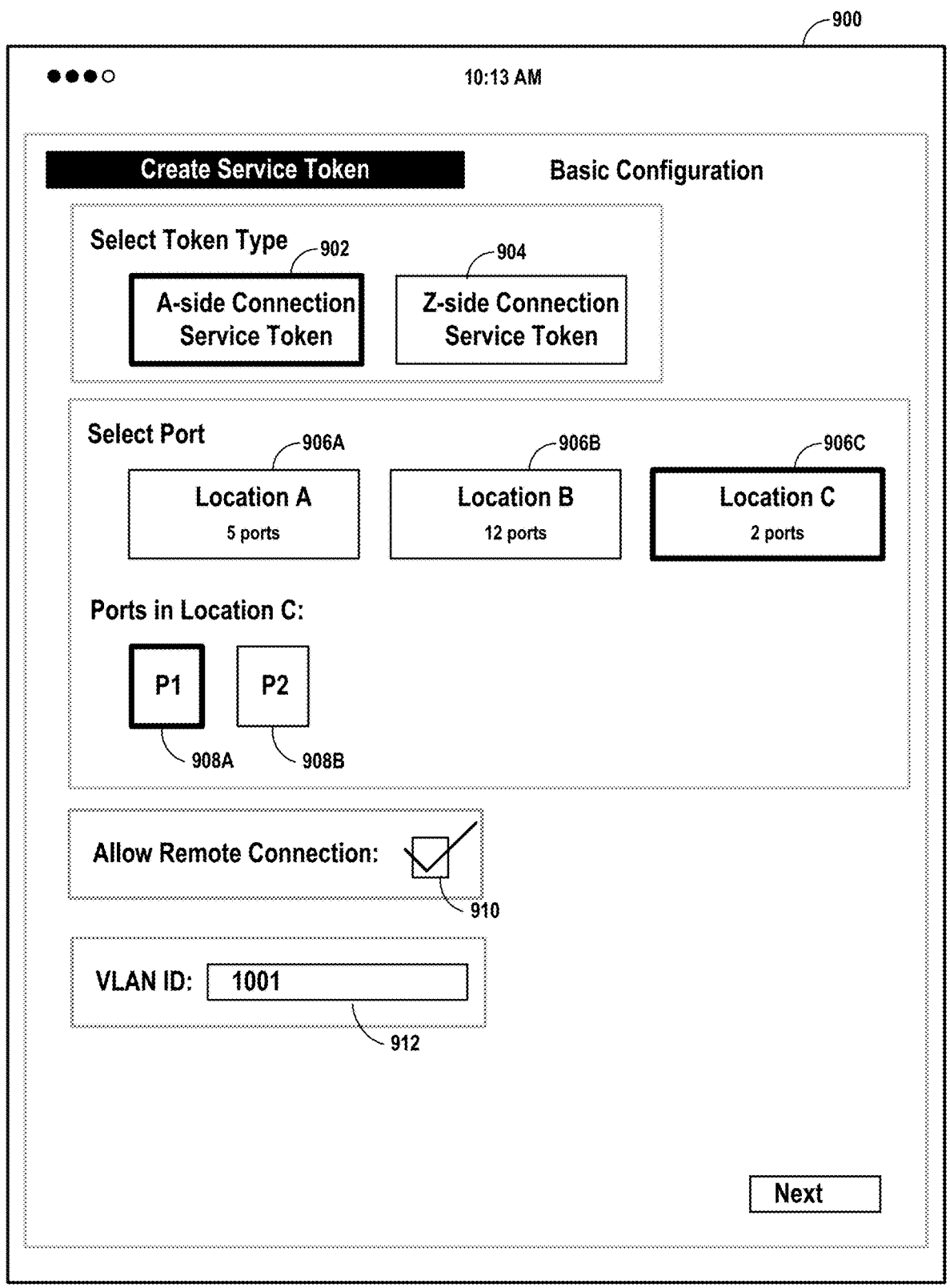
FIGS. 9A-9C depict an example set of user interfaces for creating a service token, in accordance with techniques of this disclosure.
Figure 9B:
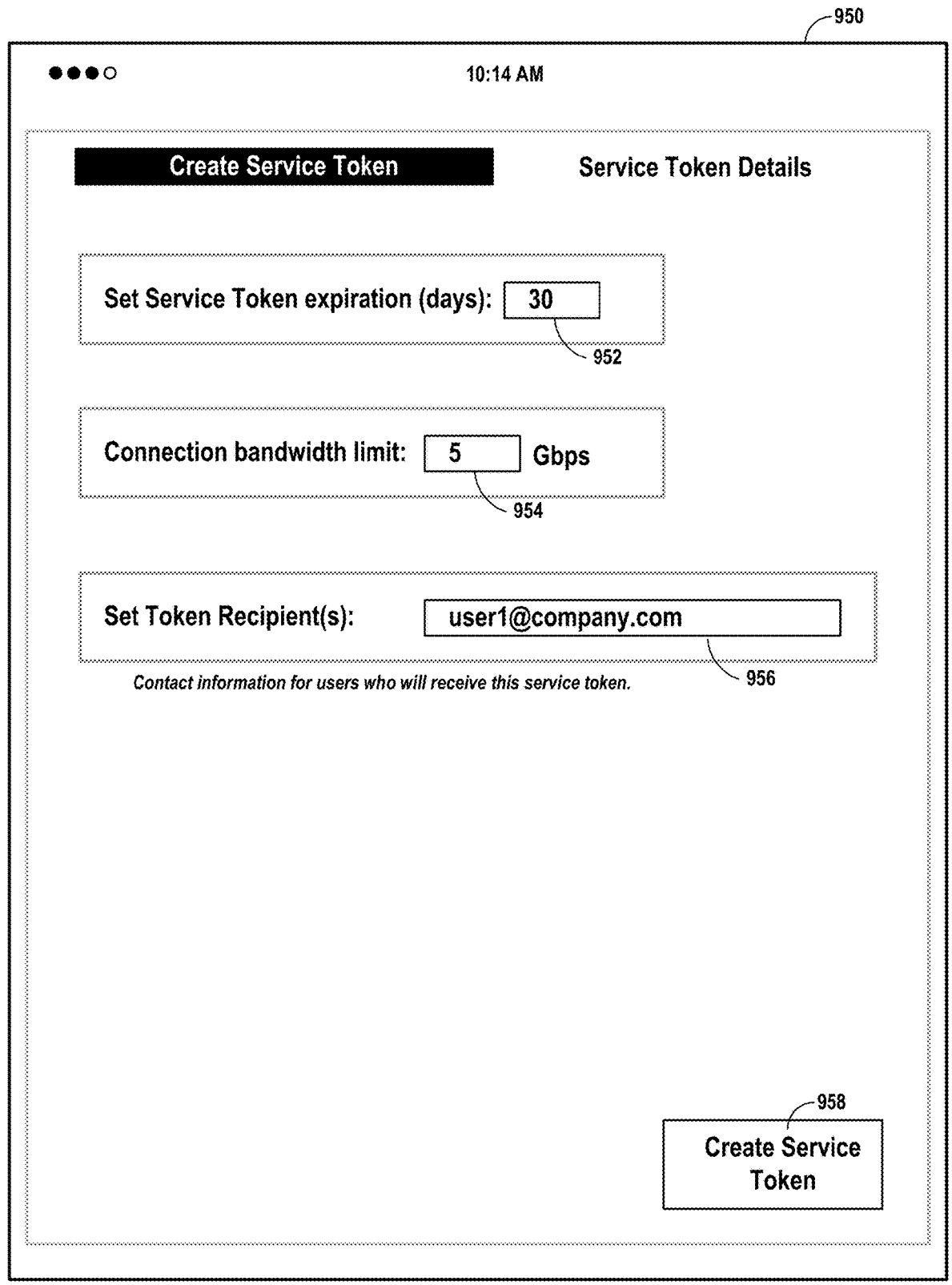
Figure 9C:
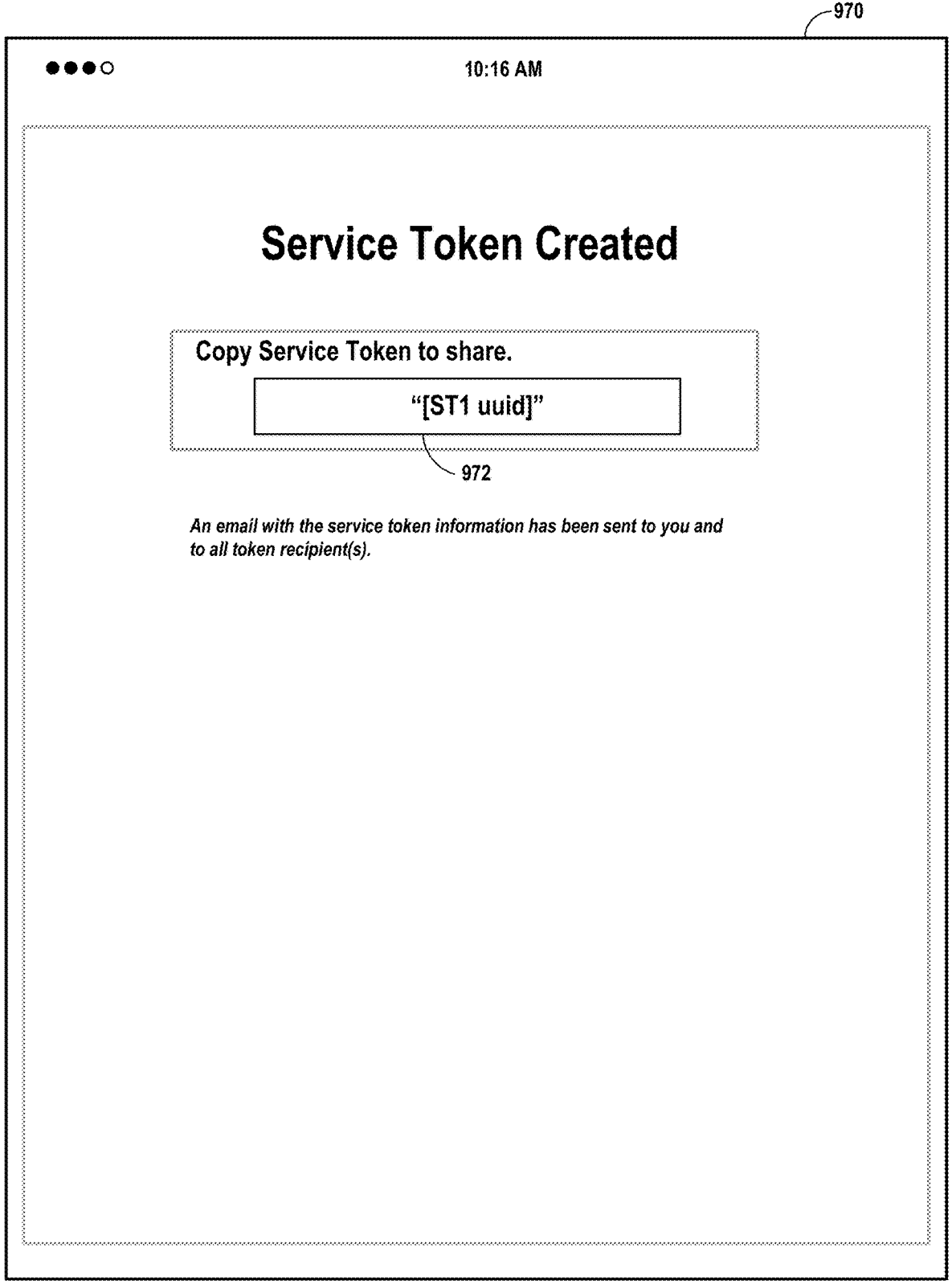

FIGS. 9A-9C depict an example set of user interfaces for creating a service token, in accordance with techniques of this disclosure. The user interfaces may be web-based an accessible via portal 130, for example, as described above. User interface (UI) 900 includes UI elements 902 and 904 for selecting an A-side and Z-side interconnection token, respectively. In FIG. 9A, a user associated with a first customer has selected UI element 902 to indicate a request for an A-side interconnection token. An A-side interconnection token generated in response to a request from the first customer of the exchange provider, for example, provides authorization to a second customer of the exchange provider to request, using the token, an interconnection to or from an asset of the first customer.

UI 900 includes elements 906A-906C for selecting a location at which the asset is located. Locations may include cities, metros, regions, countries, specific data centers or groups of data centers, or other designation. In FIG. 9A, the user has selected UI element 906C to indicate location C having 2 ports owned by the first customer. UI 900 responsively and dynamically displays UI elements 908A-908B for selecting one of the 2 ports, in this case Port P1. UI element 910 allows the user to specify whether remote connections are allowed. A remote connection is one between different exchanges, such as between an exchange in New York and an exchange in Chicago. UI element 912 allows the user to specify a VLAN ID for the eventual interconnection. The user may select the Next button of UI 900 to move to UI 950.

UI 950 is for setting service token details. UI element 952 is for specifying an expiration for the token. In this example, expiration is indicated in days. UI element 954 is for specifying a bandwidth limit for the corresponding interconnection to be created. The first customer may pre-configure a set of bandwidths selectable by a second customer when creating an interconnection using the token being created by the user for the first customer. UI element 956 is for specifying contact information for users who are to receive the service token. Such users may be associated with the second customer, for example. In response to receiving an indication of selection of UI element 958, interconnection system 103 creates the service token and causes display of UI 970.

UI 970 is displayed on successful service token creation. UI element 972 displays an indication of the service token. In this example, the indication is a unique identifier for the service token. The user for the first customer may relay the service token to the second customer for subsequent use in creating an interconnection using the asset Port P1. In some cases, interconnection system 103 sends the service token to the second customer directly.

Figure 10A:
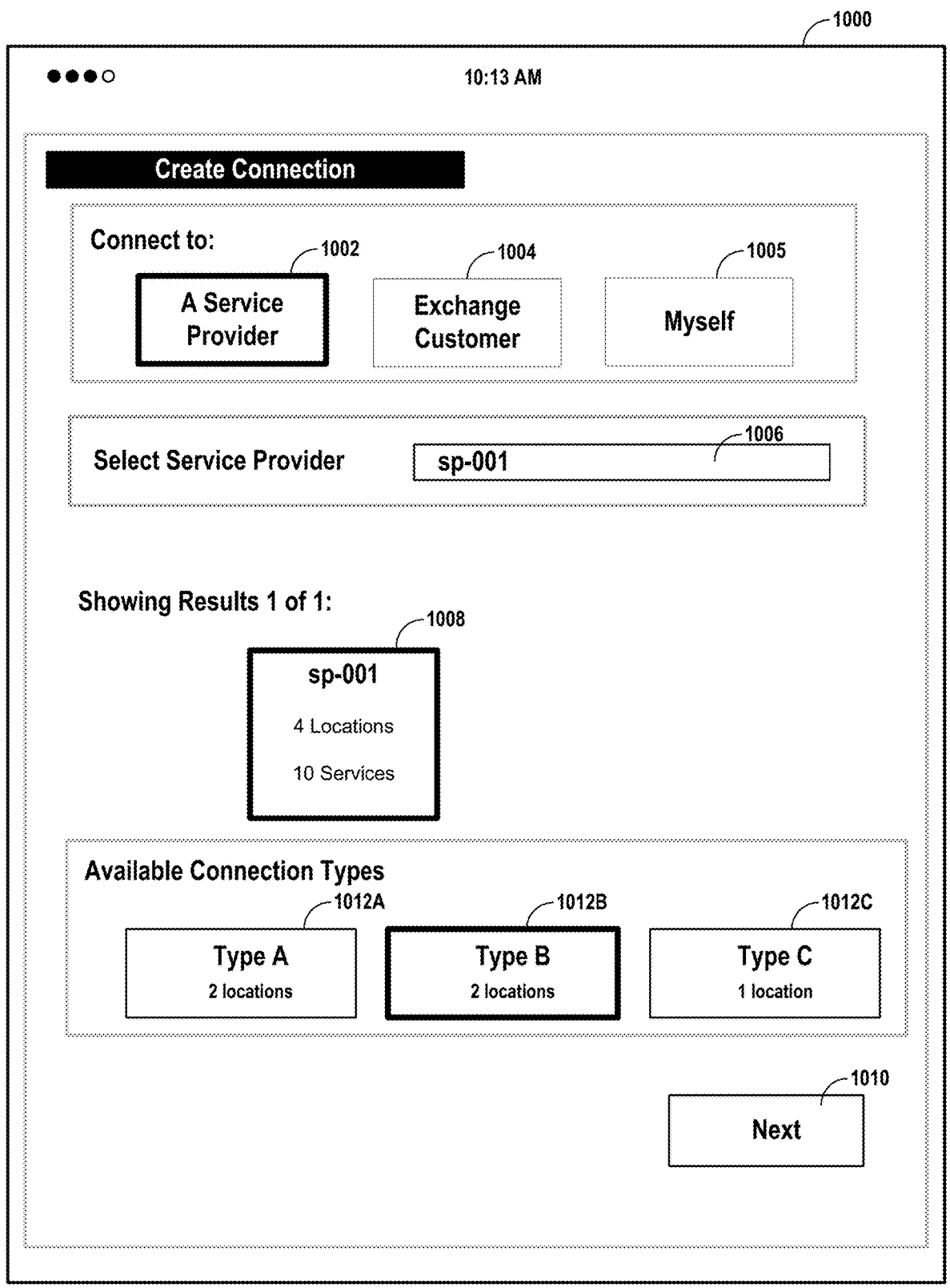
FIGS. 10A-10C depict an example set of user interfaces for using a service token to create an A-side connection, in accordance with techniques of this disclosure.
Figure 10B:
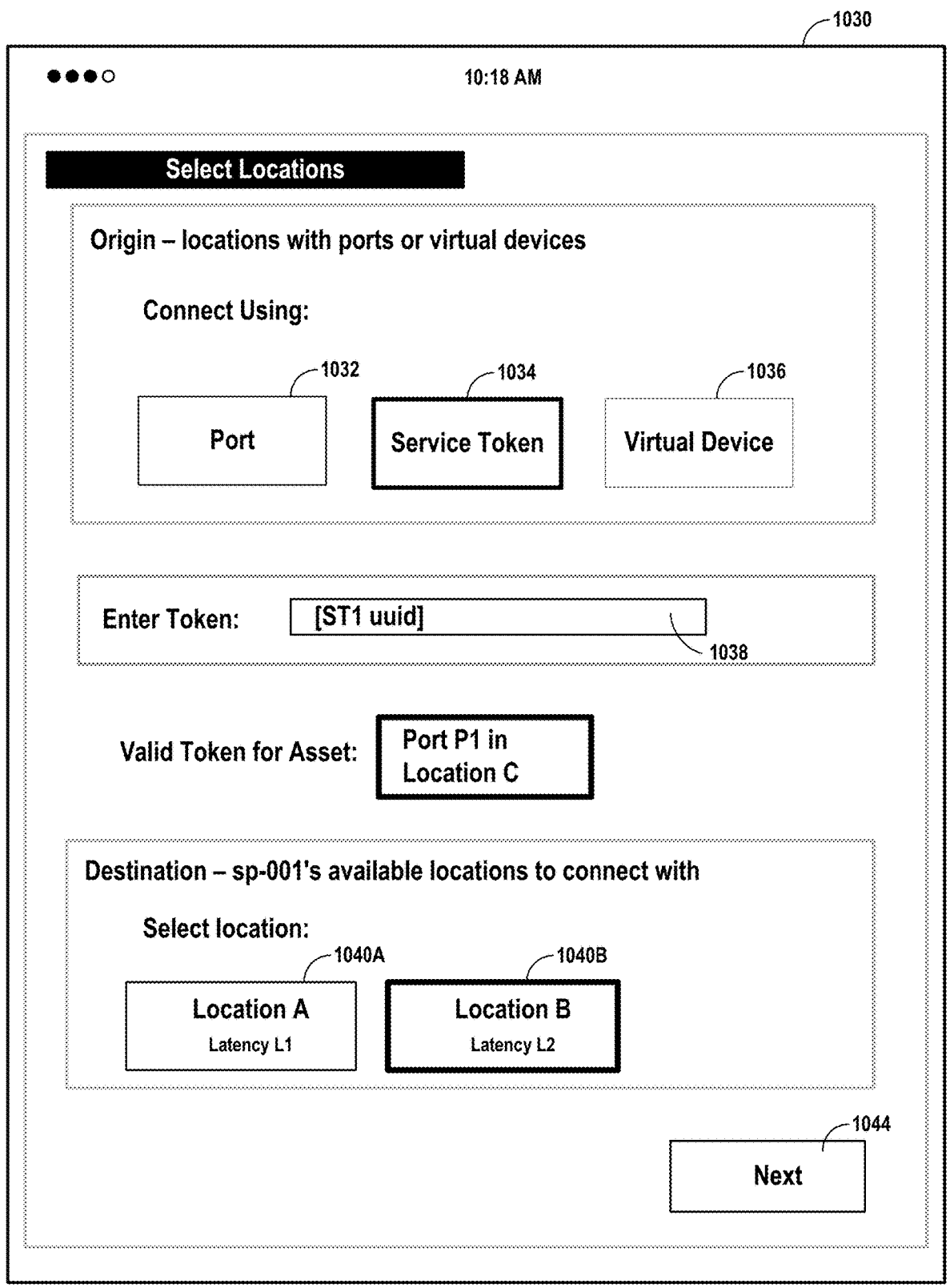
Figure 10C:
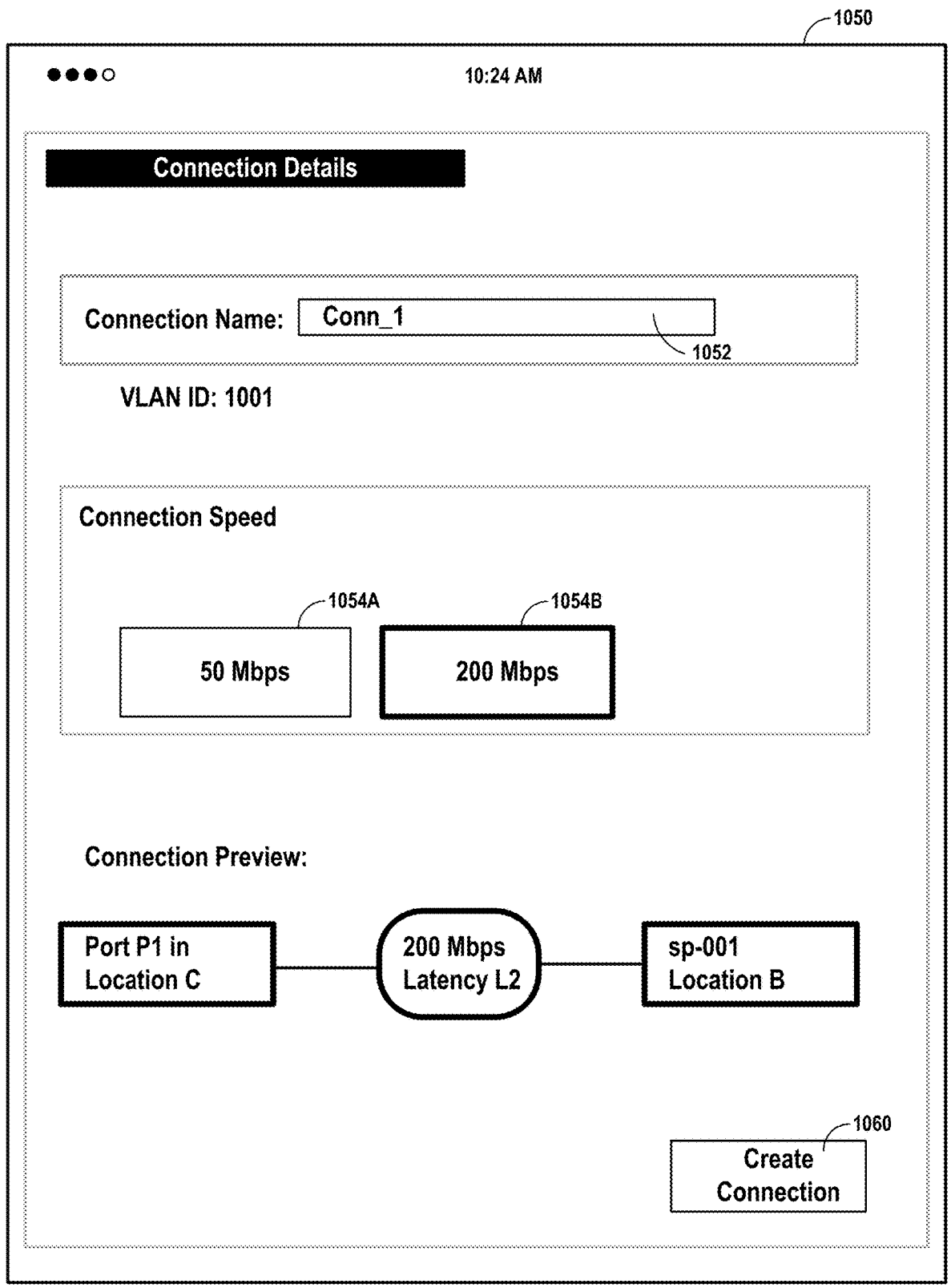
Figure 11A:
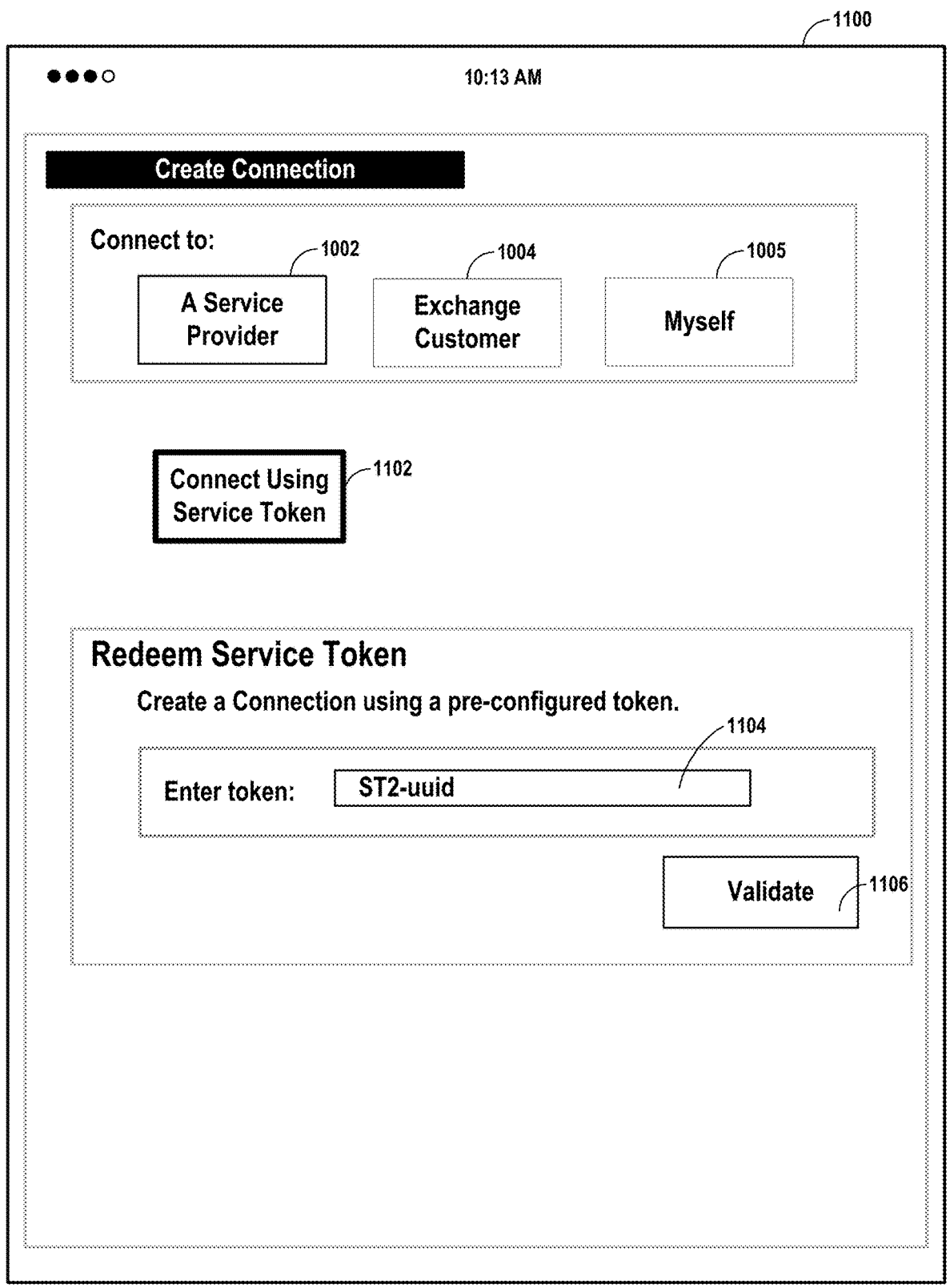
FIGS. 11A-11D depict an example set of user interfaces for using a service token to create a Z-side connection, in accordance with techniques of this disclosure.
Figure 11B:
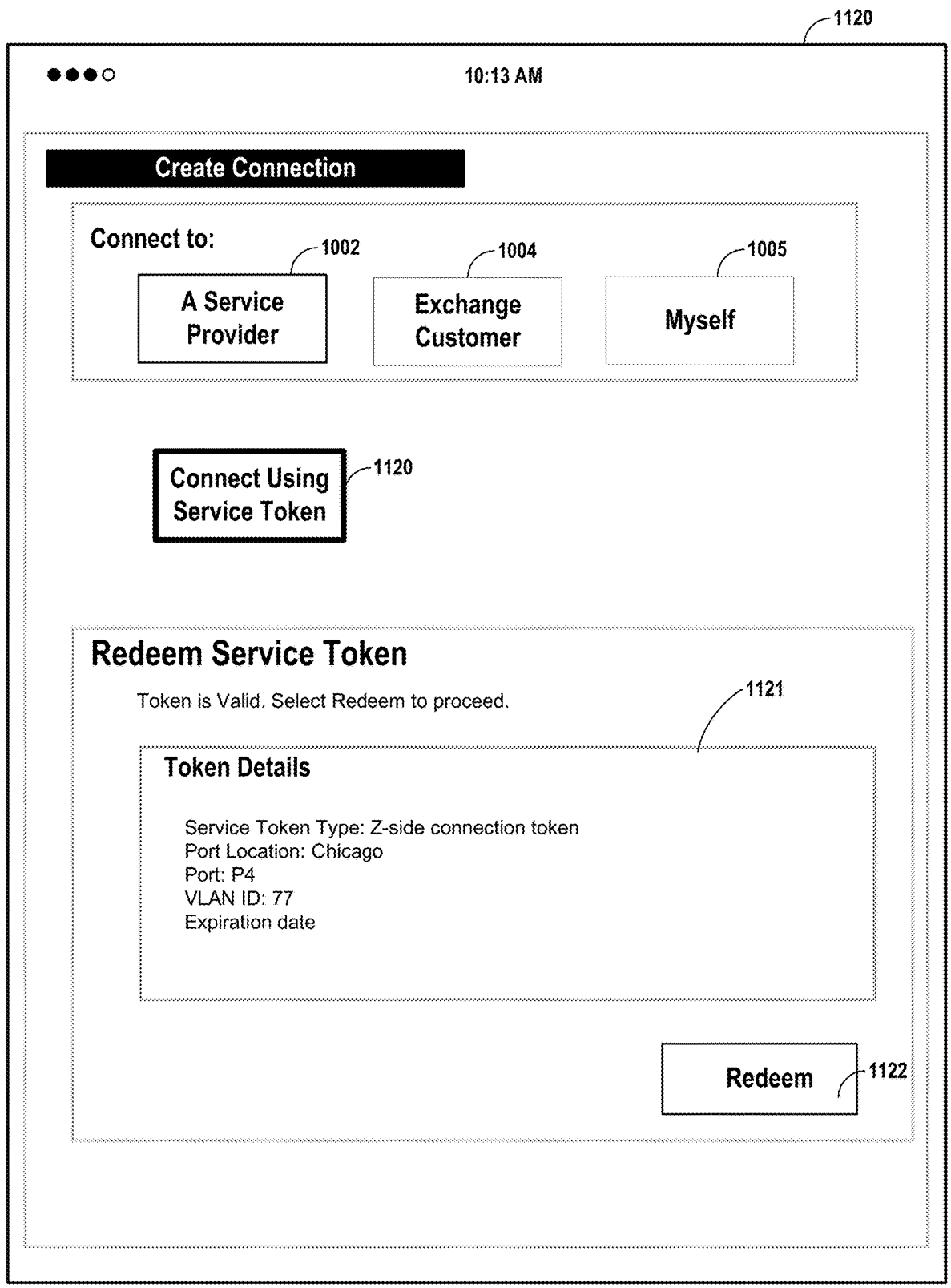
Figure 11C:
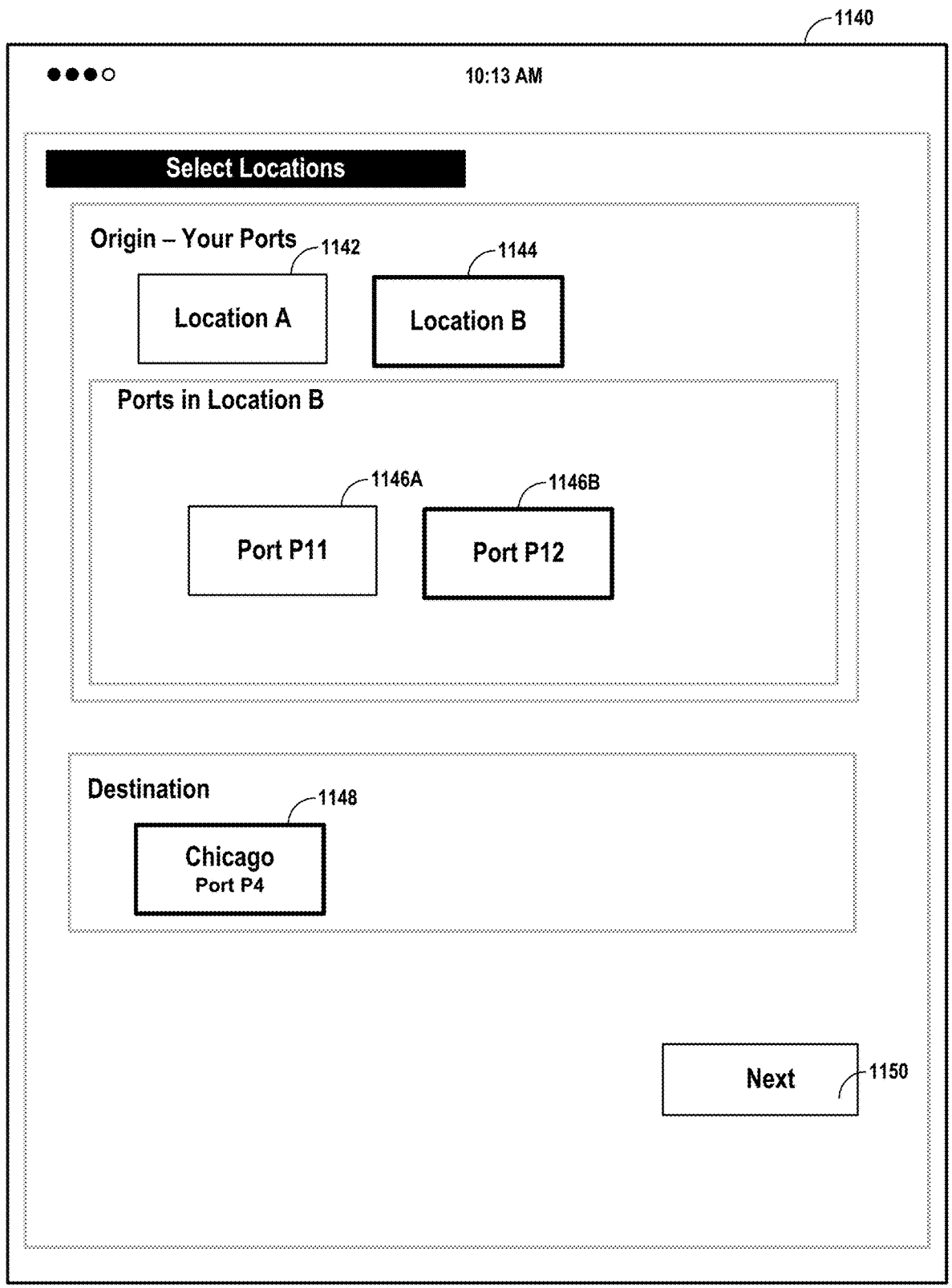
Figure 11D:
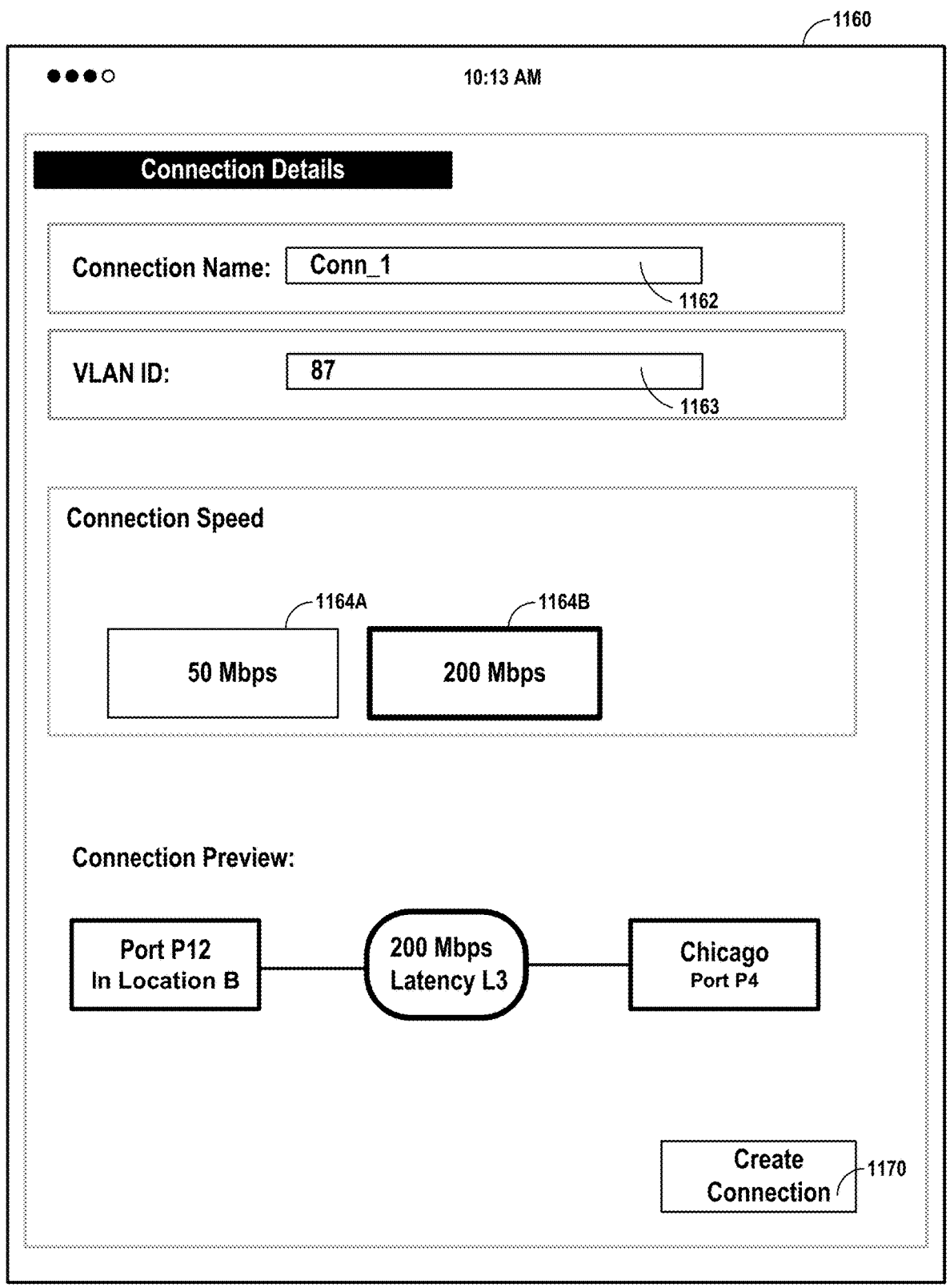

FIGS. 10A-10C depict an example set of user interfaces for using a service token to create an A-side connection, in accordance with techniques of this disclosure. The user interfaces may be web-based an accessible via portal 130, for example, as described above. UI 1000 includes elements 1002, 1004, and 1005 to select a type of entity for the Z-side of the connection: service provider, another customer of the exchange that is not a service provider, or "Myself", respectively. For Myself, the customer creating the connection uses the asset authorized by the service token to create a connection from a port of the customer to another port of the customer. Here, the user selects UI element 1002 to indicate a desired connection to a service provider.

UI 1000 presents UI elements for the user to select a particular service provider. Here, UI element 1006 is a search textbox. UI 1000 presents search results. Here, this is one result, indicated by UI element 1008 of UI 1000, for service provider "sp-001". UI 1000 indicates service provider sp-001 is located at 4 locations and has 10 services available at those locations.

UI elements 1012A-1012C allow a user to select a connection type of the desired connection. Connection types may include service provider-specific connections such as AWS Direct connect or Azure ExpressRoute. Connection types may include specific connection technologies or protocols, such as EVPL or MPLS. Here, the user selects UI element 1012B to indicate connection Type B available from service provider sp-001 at 2 locations.

After selecting Next UI element 1010, UI 1030 is displayed to allow the user to select an origin and destination for the connection being created. Here, instead of selecting (using UI elements 1032 or 1036) a port or virtual device belonging to the customer associated with the user creating the connection, the user selects UI element 1034 to indicate the user has a service token for an A-side of the connection. UI 1030 responsively displays a textbox UI element 1038 in which the user enters the service token. In this case, the token service token is that generated and indicated in UI 970 of FIG. 9C and provided to the customer now creating the connection. Because the service token was generated to authorize a particular asset, after validating the token, UI 1030 responsively displays UI elements 1040A-1040B indicating available destinations for the connection that are from the asset to, in this example, the specified service provider sp-001. Service provider sp-001 may be different from the customer that requested the service token and owns the asset, and that customer may be different from the customer now requesting a connection using the service token. Validating the service token may include causing the UI 1030 to display only those destinations that satisfy constraints specified in a request for the service token from the customer that owns the asset Port P1 in Location C.

The user selects UI element 1040B to indicate a desired connection to Location B having latency L2 from Location C. After selecting Next UI element 1044, UI 1050 is displayed to allow the user to specify connection details using UI elements 1052 and UI elements 1054A-1054B. UI 1050 displays a conceptual diagram previewing the connection according to all of the requested connection parameters and details. Upon the user selecting UI element 1060, a request to create a connection is submitted to interconnection platform 103. The request includes the connection parameters and details. Interconnection platform 103 provisions the connection in one or more exchanges by configuring networks of the exchanges, the connection including (or connecting to or from) the asset/resource authorized by the service token.

FIGS. 11A-11D depict an example set of user interfaces for using a service token to create a Z-side connection, in accordance with techniques of this disclosure. The user interfaces may be web-based an accessible via portal 130, for example, as described above.

UI 1100 is similar to UI 1000 of FIG. 10A and includes a UI element 1102 for indicating a request to create a connection using a service token. The user provides an indication of a service token to UI 1100. In this example, UI 1100 includes textbox UI element 1104 for the user to enter the service token. On selection of UI element 1106, interconnection platform 103 validates the service token provided.

UI 1120 indicates the service token is valid and includes UI elements 1121 displaying details of the service token, including its interconnection (a type of "service") token type: Z-side. On selection of UI element 1122, the user redeems the service token to indicate an intent to create a connection using the asset authorized by the service token.

On selection of UI element 1122, UI 1140 is displayed. UI 1140 allows the user to select an origin and UI element 1148 displays the destination. Because the redeemed service token was for Port P4 in the Chicago exchange, the destination is already set. The user selects an origin asset (here, port P12 at Location B) using UI elements 1142, 1144 and 1146A-1146B. This indicates intent to create a connection between Port P12 in Location B and Port P4 in Chicago.

On selection of Next UI element 1150, UI 1160 is displayed. UI 1160 allows the user to specify additional connection details using UI elements 1162, 1163, and 1164A-1164B. UI 1160 displays a conceptual diagram previewing the connection according to all of the requested connection parameters and details. Upon the user selecting UI element 1170, a request to create a connection is submitted to interconnection platform 103. The request includes the connection parameters and details. Interconnection platform 103 provisions the connection in one or more exchanges by configuring networks of the exchanges, the connection including (or connecting to or from) the asset/resource authorized by the service token.

Figure 12:
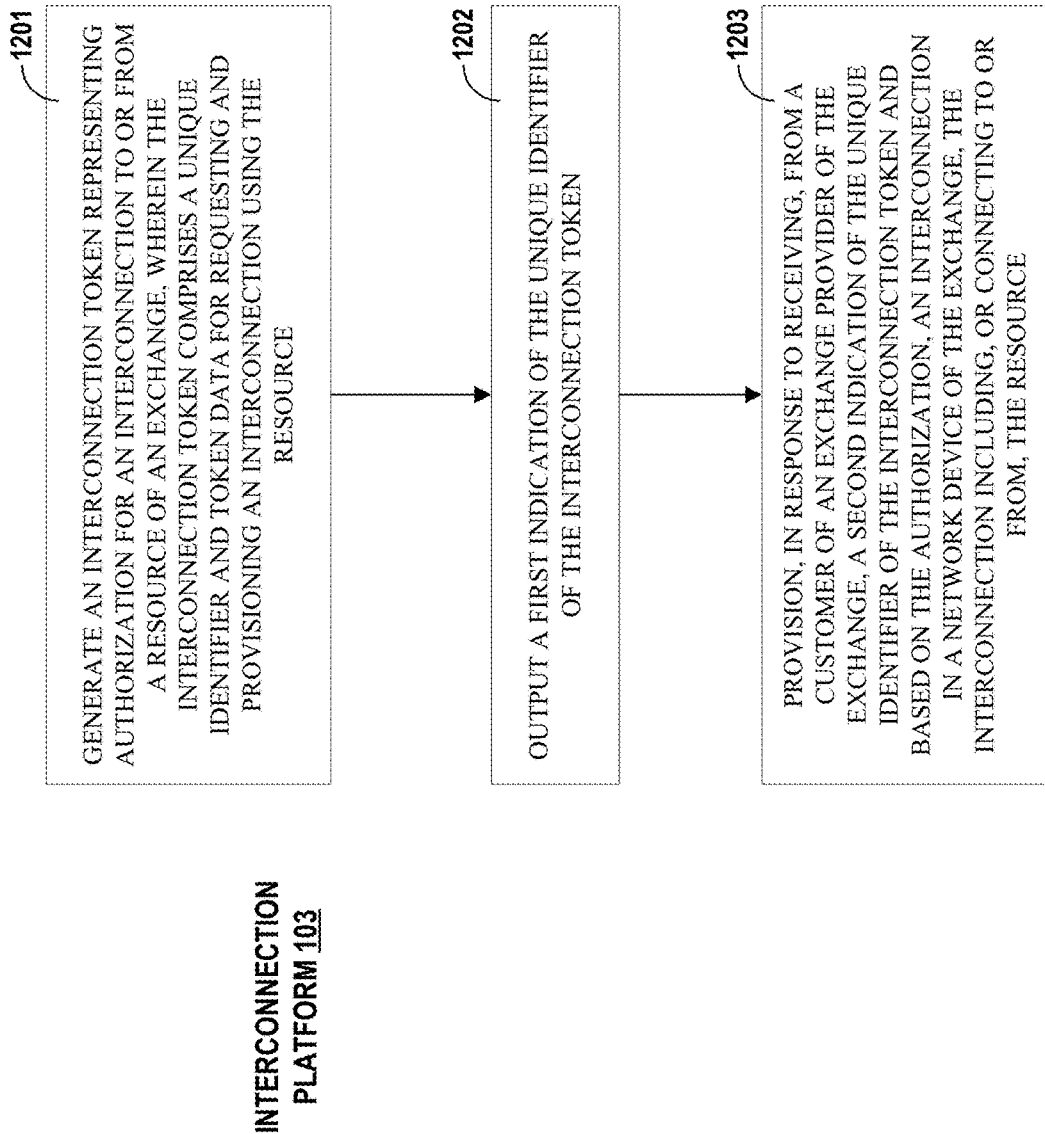
FIG. 12 is a flowchart illustrating an example mode of operation for a system, according to techniques of this disclosure.

FIG. 12 is a flowchart illustrating an example mode of operation for an interconnection platform, according to techniques of this disclosure. In this example, interconnection platform 103 generates an interconnection token representing authorization for an interconnection to or from a resource of the exchange, wherein the interconnection token comprises a unique identifier and token data for requesting and provisioning an interconnection, using the resource, for a customer of an exchange provider of the exchange (1201). Interconnection platform 103 outputs a first indication of the unique identifier of the interconnection token (1202). Interconnection platform 103 provisions, in response to receiving, from a customer, a second indication of the unique identifier of the interconnection token, an interconnection in the network resources of the exchange, the interconnection including, or connecting to or from, the resource (1203).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
generating, by an interconnection platform for an exchange, an interconnection token representing authorization for an interconnection to or from a resource of the exchange, wherein the interconnection token comprises a unique identifier and token data for requesting and provisioning an interconnection using the resource;
outputting a first indication of the unique identifier of the interconnection token; and
provisioning, by the interconnection platform, in response to receiving, from a customer of an exchange provider of the exchange, a second indication of the unique identifier of the interconnection token and based on the authorization, an interconnection in a network device of the exchange, the interconnection including, or connecting to or from, the resource.

2. The method of claim 1, further comprising:
storing, by the interconnection platform, the interconnection token; and
in response to receiving the second indication of the unique identifier for the interconnection token, validating the interconnection token,
wherein provisioning the interconnection in the network device of the exchange comprises provisioning, in response to determining the interconnection token is valid, the interconnection in the network device of the exchange.

3. The method of claim 2, wherein determining the interconnection token is valid comprises determining the interconnection token is not expired.

4. The method of claim 1, further comprising:
reserving, by the interconnection platform, the resource of the exchange,
wherein generating the interconnection token comprises generating the interconnection token in response to successfully reserving the resource of the exchange.

5. The method of claim 1, wherein the exchange comprises one of a cloud exchange, an internet exchange, or an ethernet exchange.

6. The method of claim 1, wherein the interconnection comprises a virtual circuit of a cloud exchange.

7. The method of claim 1, wherein the resource of the exchange comprises a hardware port connected to the network device of the exchange.

8. The method of claim 1, further comprising:
receiving, by the interconnection platform, an indication of a request for the interconnection from the customer of the exchange provider,
wherein the request for the interconnection is associated with the interconnection token, and
wherein the request for the interconnection indicates an origin and a destination for the interconnection, wherein at least one of the origin or the destination comprises the resource.

9. The method of claim 8, further comprising:
receiving, by a portal application, the request for the interconnection from the customer of the exchange provider; and
outputting, by the portal application to the interconnection platform, a request message to provision the interconnection, the request message including the indication of a request for an interconnection from the customer of the exchange provider.

10. The method of claim 1,
wherein the customer is a first customer,
wherein the exchange provider has assigned the resource to the first customer, and
wherein the interconnection token comprises an A-side interconnection token that represents authorization, from a second customer of the exchange provider, for the first customer to request provisioning of an interconnection between the resource and a resource assigned by the exchange provider to the second customer.

11. The method of claim 1,
wherein the customer is a first customer,
wherein the exchange provider has assigned the resource to a second customer of exchange provider, and
wherein the interconnection token comprises a Z-side interconnection token that represents authorization, from the second customer of the exchange provider, for the first customer to request provisioning of an interconnection between the resource and a port or service made available, for interconnection via the exchange, to the first customer by the exchange provider.

12. The method of claim 1, wherein the customer comprises a first customer, the method further comprising:
receiving, by the interconnection platform, an indication of a request for an interconnection token,
wherein the request indicates the resource of the exchange,
wherein the request is made by a second customer of the exchange provider, and
wherein generating the interconnection token comprises generating, in response to the indication of the request, the interconnection token.

13. The method of claim 12,
wherein the request indicates a constraint on an origin or destination for the interconnection, and
wherein provisioning the interconnection in the network device of the exchange comprises provisioning, by the interconnection platform in response to processing a request for the interconnection to determine the constraint is satisfied, the interconnection in the network device of the exchange.

14. A system comprising:

an exchange comprising network resources; and an interconnection platform for the exchange, the interconnection platform comprising processing circuitry and configured to:

generate an interconnection token representing authorization for an interconnection to or from a resource of the exchange, wherein the interconnection token comprises a unique identifier and token data for requesting and provisioning an interconnection using the resource;

output a first indication of the unique identifier of the interconnection token; and provision, in response to receiving, from a customer of an exchange provider of the exchange, a second indication of the unique identifier of the interconnection token and based on the authorization, an interconnection in a network device of the exchange, the interconnection including, or connecting to or from, the resource.

15. The system of claim 14, wherein the exchange comprises one of a cloud exchange, an internet exchange, and an ethernet exchange.

16. The system of claim 14, wherein the exchange comprises network functions virtualization infrastructure.

17. The system of claim 14, wherein the interconnection platform is further configured to:

receive an indication of a request for an interconnection from the customer of the exchange provider, wherein the request for the interconnection is associated with the interconnection token, and wherein the request for the interconnection indicates an origin and a destination for the interconnection, wherein at least one of the origin and the destination comprises the resource.

18. The system of claim 14, wherein the customer comprises a first customer, and wherein the interconnection platform is further configured to:

receive an indication of a request for an interconnection token, wherein the request indicates the resource of the exchange, wherein the request is made by a second customer of the exchange provider, and wherein to generate the interconnection token the interconnection platform is configured to generate, in response to the indication of the request, the interconnection token.

19. The system of claim 14, wherein the interconnection token comprises one of an A-side interconnection token or a Z-side interconnection token.

20. A non-transitory computer-readable storage medium comprising instructions for causing processing circuitry of an interconnection platform to:

generate an interconnection token representing authorization for an interconnection to or from a resource of an exchange, wherein the interconnection token comprises a unique identifier and token data for requesting and provisioning an interconnection using the resource;

output a first indication of the unique identifier of the interconnection token; and provision, in response to receiving, from a customer of an exchange provider of the exchange, a second indication of the unique identifier of the interconnection token and based on the authorization, an interconnection in a network device of the exchange, the interconnection including, or connecting to or from, the resource.

* * * * *